(12) United States Patent
Lu

(10) Patent No.: US 12,121,094 B2
(45) Date of Patent: Oct. 22, 2024

(54) REUSABLE ENERGY ABSORBING APPARATUS INCLUDING GAS-LIQUID INTERACTIONS IN NANOPORES

(71) Applicant: Board of Trustees of Michigan State University, East Lansing, MI (US)

(72) Inventor: Weiyi Lu, Middleton, WI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 611 days.

(21) Appl. No.: 17/498,952

(22) Filed: Oct. 12, 2021

(65) Prior Publication Data
US 2022/0117345 A1      Apr. 21, 2022

Related U.S. Application Data

(60) Provisional application No. 63/093,966, filed on Oct. 20, 2020.

(51) Int. Cl.
F16F 9/00 (2006.01)
A42B 3/12 (2006.01)

(52) U.S. Cl.
CPC .............. *A42B 3/121* (2013.01); *F16F 9/006* (2013.01)

(58) Field of Classification Search
CPC .... A41D 31/28; A41D 31/0044; A42B 3/121; A42B 3/06; C08J 5/18; C08J 5/04; F16F 9/006
See application file for complete search history.

(56) References Cited

U.S. PATENT DOCUMENTS

| | | | |
|---|---|---|---|
| 6,615,959 B2 | 9/2003 | Eroshenko | |
| 9,074,054 B2* | 7/2015 | Chen | C08J 3/11 |
| 10,369,962 B2* | 8/2019 | Faruque | F16F 9/53 |
| 10,562,488 B2* | 2/2020 | Faruque | F16F 9/06 |
| 2012/0052285 A1* | 3/2012 | Chen | C08J 9/283 |
| | | | 427/372.2 |
| 2016/0108194 A1* | 4/2016 | Topolkaraev | C08J 5/04 |
| | | | 521/134 |
| 2018/0179357 A1* | 6/2018 | Lu | A61L 27/48 |
| 2018/0319362 A1* | 11/2018 | Faruque | F16F 9/30 |

(Continued)

FOREIGN PATENT DOCUMENTS

WO    WO 2007/044030 A2    4/2007

OTHER PUBLICATIONS

Li, M. et al., "Nanopore size effect on critical infiltration depth of liquid nanofoam as a reusable energy absorber," Journal of Applied Physics, vol. 125, p. 044303 (Jau. 30, 2019).

(Continued)

*Primary Examiner* — Thomas W Irvin
(74) *Attorney, Agent, or Firm* — Harness, Dickey & Pierce, PLC

(57) ABSTRACT

An energy absorbing apparatus includes particles with nanopores in a liquid. A further aspect employs a reusable energy absorbing apparatus including gas-liquid interactions in nanopores. Another aspect of the present apparatus uses oversolubility of gas in a solution to enhance bubble nucleation in hydrophobic nanopores or nanochannels, which suppresses gas outflow while promoting liquid outflow from particles. Still another aspect includes anions within an aqueous electrolytic solution, containing nanoporous material therein.

29 Claims, 16 Drawing Sheets

(56) References Cited

U.S. PATENT DOCUMENTS

2018/0326940 A1* 11/2018 Faruque .................. F16F 5/00

OTHER PUBLICATIONS

Li, M., et al., "Liquid marble: A novel liquid nanofoam structure for energy absorption," American Institute of Physics Advances, vol. 7, p. 055312 (May 24, 2017).
Li, M., et al., "Enhanced filler-tube wall interaction in liquid nanofoam-filled thin-walled tubes," Composite Structures, vol. 200, pp. 120-126 (May 19, 2018).
Zhang, Y., et al., "Compressing liquid nanofoam systems: liquid infiltration or nanopore deformation?" Nanoscale, pp. 18427-18894, vol. 10, No. 39 (Oct. 21, 2018).

* cited by examiner

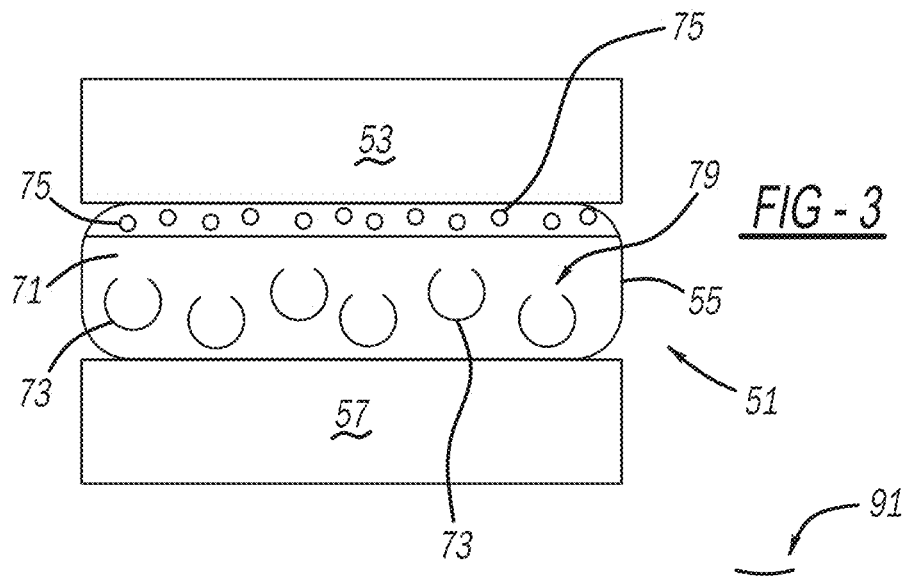
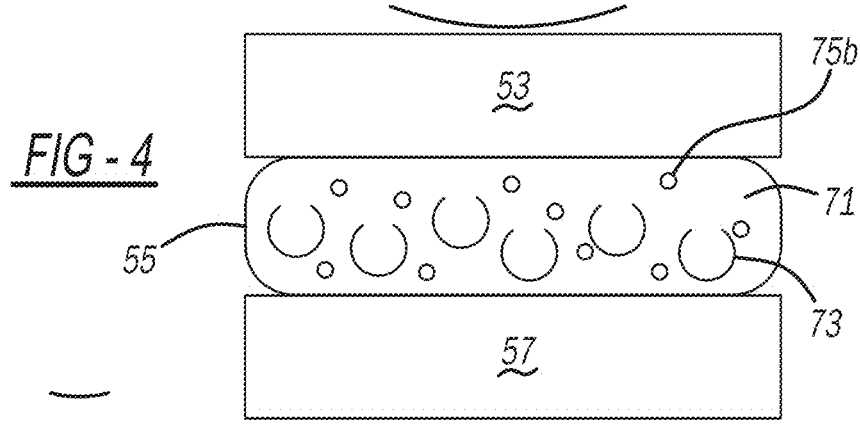
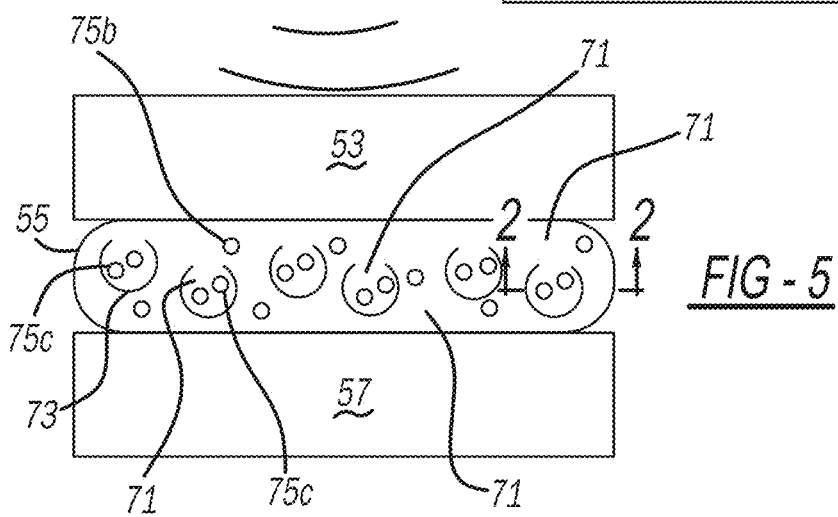

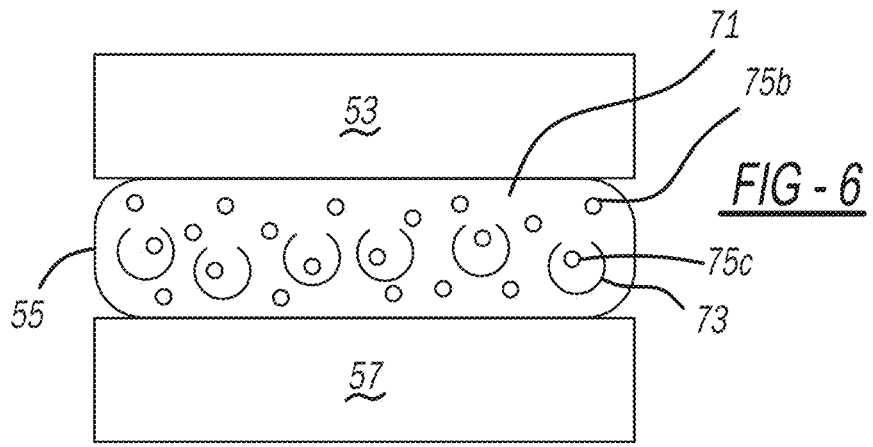
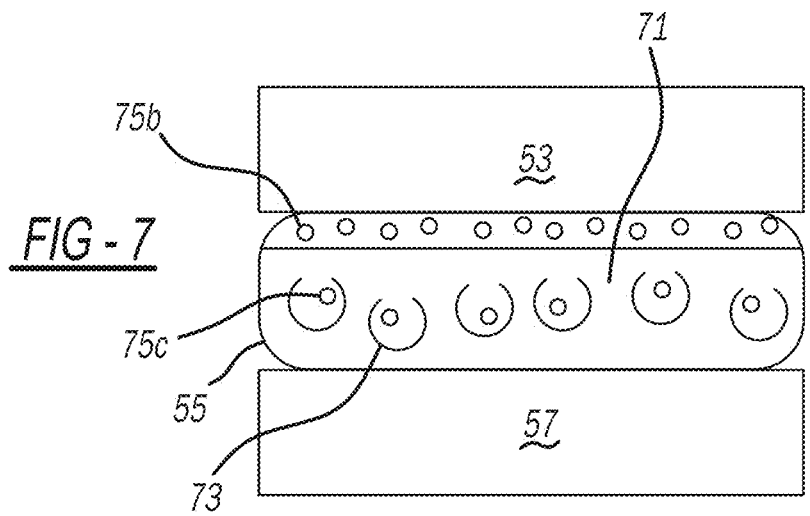
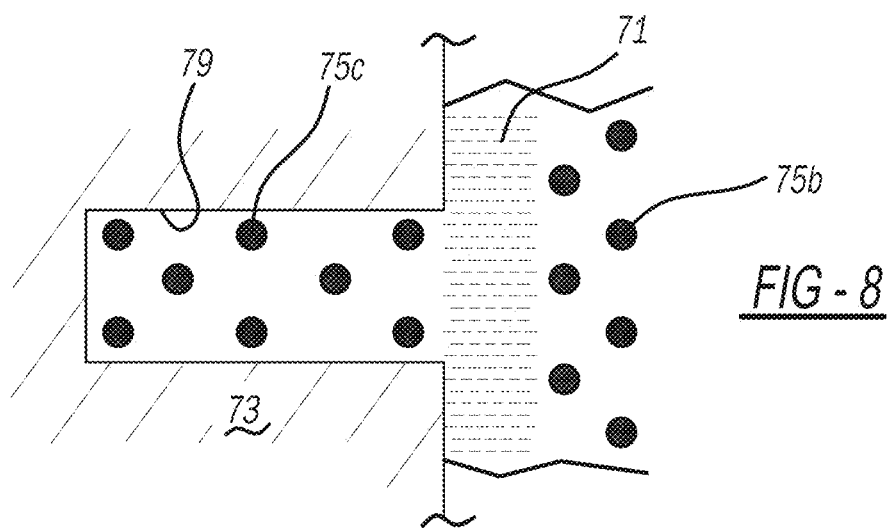

REUSABLE ENERGY ABSORBING APPARATUS INCLUDING GAS-LIQUID INTERACTIONS IN NANOPORES

CROSS-REFERENCE TO RELATED APPLICATIONS

The application claims priority benefit to U.S. Provisional Patent Application Ser. No. 63/093,966, filed on Oct. 20, 2020, which is incorporated by reference herein.

GOVERNMENT SUPPORT

This invention was made with government support under 1803695 awarded by the National Science Foundation. The government has certain rights in the invention.

BACKGROUND AND SUMMARY

The present application generally pertains to an energy absorbing apparatus and more particularly to a reusable energy absorbing apparatus including gas-liquid interactions in nanopores.

A composition including a hydrogel with nanoporous particles is discussed in U.S. Patent Publication No. 2018/0179357 entitled "Energy Dissipative Composition Including a Hydrogel Reinforced with Nanoporous Particles," which was invented by Weiyi Lu, a common inventor with the present application, et al., and is incorporated by reference herein. While this composition is a significant improvement in the field, reusability for repeated impacts can be further improved. Mingzhe Li, Lijiang Xu and (co-author/present inventor) Weiyi Lu, "Nanopore Size Effect on Critical Infiltration Depth of Liquid Nanofoam as a Reusable Energy Absorber," J. Applied Physics 125, 044303 (Jan. 30, 2019), discloses liquid defiltration experiments with liquid nanofoam to investigate energy absorption reuse as a function of nanopore size. However, additional improvements are still desired to enhance commercialization and repetitive impact absorption.

In accordance with the present invention, an energy absorbing apparatus includes particles with nanopores in a liquid. A further aspect employs a reusable energy absorbing apparatus including gas-liquid interactions in nanopores. Another aspect of the present apparatus uses oversolubility of gas in a solution to enhance bubble nucleation in hydrophobic nanopores or nanochannels, which suppresses gas outflow while promoting liquid outflow from particles. Still another aspect includes anions within an aqueous electrolytic solution, containing nanoporous material therein. A sealed and flexible pouch, coupled to a rigid wall, contains liquid and particles, where there is oversolubility of gas molecules within the liquid when the liquid is in nanopores of the particles. Yet another aspect provides methods of making and using a reusable energy absorbing apparatus including gas-liquid interactions in nanopores.

The present energy absorbing apparatus is advantageous over conventional devices. For example, the present apparatus has significantly improved reusability properties since it more completely expels liquid from a hollow cavity within each nanopores after an initial impact force is absorbed by the liquid entering the particles. By way of a nonlimiting and beneficial example, lower bulk gas solubility, a larger gas oversolubility factor, and a smaller nanochannel or nanopore size, lead to a higher degree of liquid outflow and recoverability, due to immersion of the particles containing hydrophobic nanochannels into a non-wettable liquid phase. Moreover, the gas-liquid interaction can be adjusted or tailored for different uses by predetermining different combinations of: surface properties, sizes of nanochannels, properties of a liquid phase, selection of ion species, selection of gas species, and the like. The present apparatus is ideally suited for uses with repeated impact forces such as for vibration and earthquake dampeners and isolation systems, shock absorbers, helmets, armor, automotive vehicle crash absorbers, and the like. Furthermore, the particle and liquid combination of the present apparatus is advantageously configured to bear a load, such as an outer helmet shell, an outer armor shell or structural supports. The present energy absorbing apparatus is less expensive than prior constructions since a hydrogel is not used in the present liquid and particle solution. Additional advantageous and features of the present system and method will become apparent from the following description and appended claims, taken in conjunction with the accompanying drawings.

BRIEF DESCRIPTION OF THE DRAWINGS

FIGS. 3-7 are a series of diagrammatic, cross-sectional views, taken along line 3-3 of FIG. 1, showing the present apparatus in different conditions;

FIGS. 8-13 are a series of diagrammatic views showing the present apparatus in different conditions;

and

Figure 36:
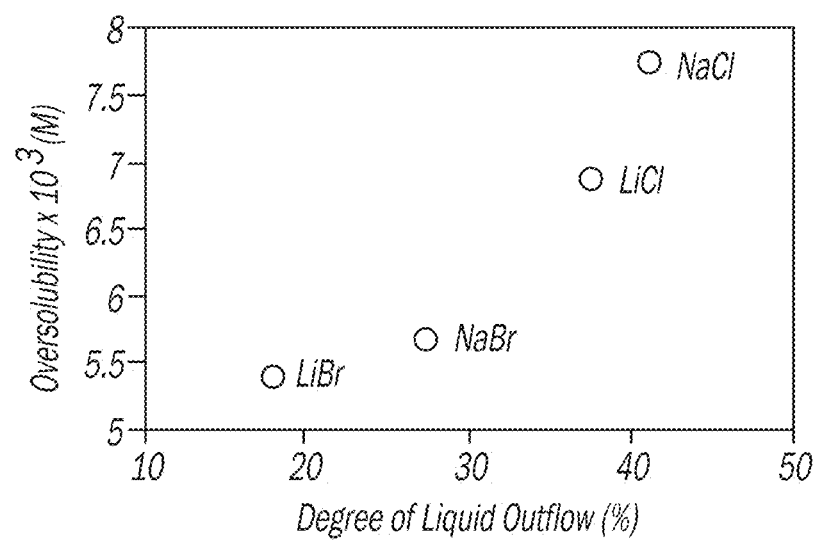

FIG. 36 is an oversolubility versus degree of liquid outflow graph for the present apparatus.

DETAILED DESCRIPTION

Figure 1:
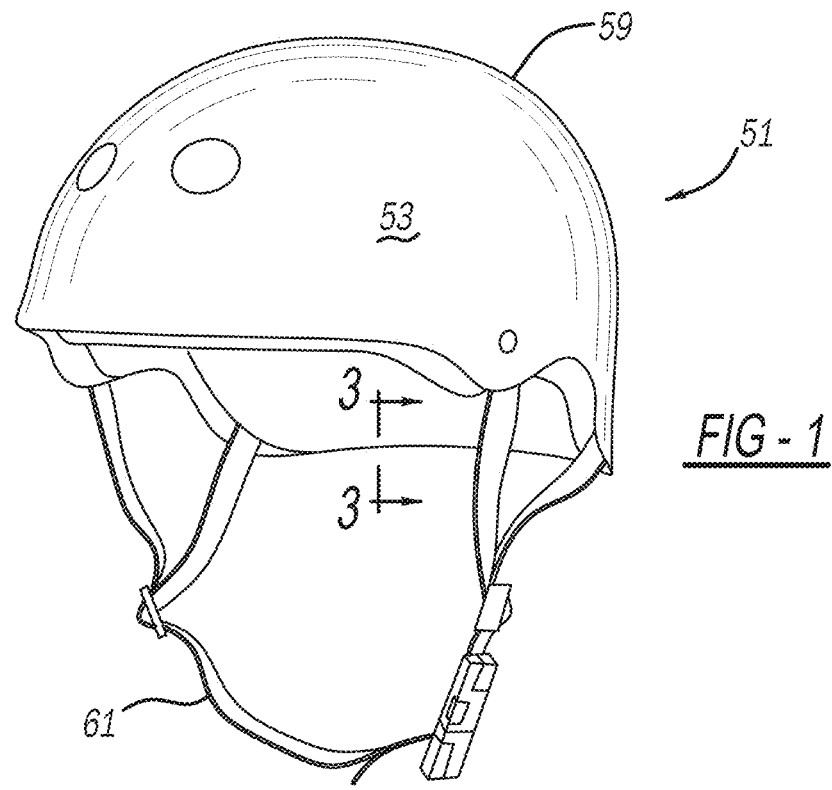
FIG. 1 is a perspective view showing the present apparatus including a helmet.
Figure 2:
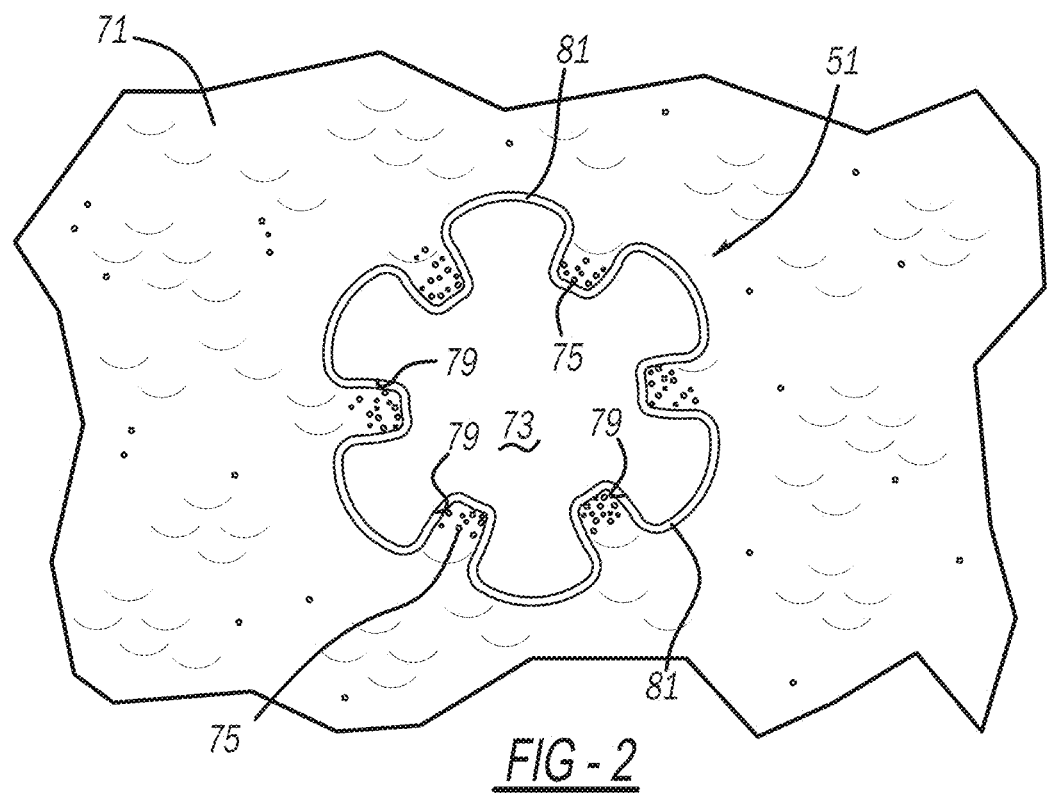
FIG. 2 is an enlarged cross-sectional view, taken along line 2-2 of FIG. 5, showing the present apparatus.

A preferred embodiment of an energy absorbing apparatus 51 is shown in FIGS. 1-3. Energy absorbing apparatus 51 includes an exterior shell or wall structure 53, a sealed pouch 55, and an optional interior structure such as a pliable foam pad 57. In one exemplary use, a protective helmet 59 has a shell structural 53 of a rigid or slightly flexible polymeric material that is three dimensionally curved. Flexible straps 61 adjustably and removably secure helmet 59 to a user's head. The helmet may be for sports like bicycling, American football, skiing, motorcycling or the like, or can be a construction helmet or military helmet.

Pouch 55 of energy absorbing apparatus 51 preferably is a flexible and polymeric membrane within which is a solution including a liquid 71, microparticles 73 and gas molecules 75. Pouch 55 is adhesively bonded or otherwise coupled to structures 53 and 57. In the helmet use, shell structure 53 is thinner and laterally larger than is the underlying filled pouch 55.

Liquid 71 is preferably fresh or salt water, optionally with electrolytes therein. Liquid examples are at least one of: water, chloroform, n-hexane, ethanol, N-Methyl-2-pyrrolidone (NMP), ionic liquids such as 1-Butyl-3-methylimidazolium tetrafluoroborate (BMIM BF4), 1-Butyl-3-methylimidazolium hexafluorophosphate (BMIM PF6), 1-Butyl-3-methylimidazolium chloride (BMIM Cl), 1-Ethyl-3-methylimidazolium tetrafluoroborate (EMIM BF4), 1-Ethyl-3-methylimidazolium hexafluorophosphate (EMIM PF6), 1-Ethyl-3-methylimidazolium chloride (EMIC), etc. Advantageously, ionic liquids have a lower vapor pressure and are nonflammable as compared to other liquids. Furthermore, Chloroform beneficially has a low freezing point, which makes it well suited for outdoor use in cold environments. If used, exemplary electrolytes in water are one or more of:

Cations=$Li^+$, $Na^+$, $K^+$, $Rb^+$, $Cs^+$, $Mg^{2+}$, $Cr^{2+}$, $Ba^{2+}$, $Fe^{2+}$, $Co^{2+}$, $Ni^{2+}$, $Cu^{2+}$, $Mn^{2+}$, $Zn^{2+}$, $Cd^{2+}$, $Al^{3+}$, $Fe^{3+}$, and/or $Cr^{3+}$.

Anions=$F^-$, $Cl^-$, $Br^-$, $I^-$, $NO_3^-$, $HCO_3^-$, $SO_4^{2-}$, and/or $CO_3^{2-}$.

Furthermore, microparticles 73 are preferably nanoporous silica (such as SP-120-20 from DAISO Fine Chem USA, Inc.). The microparticles are in powder form prior to suspension in the liquid, with a diameter of each nanopore 79 being approximately 10-100 nm, and preferably 12 nm, and a diameter of each microparticle 73 being approximately 10-100 μm, and preferably about 20 μm. The preferred specific pore volume of the nanoporous silica is about 700 $mm^3/g$.

Both inner and outer surfaces of each microparticle 73 is hydrophobic by coating a thin layer of chloro(dimethyl) octylsilane material 81 thereon, as can best be observed in FIG. 2. Gas molecules or bubbles 75 are preferably air or $CO_2$. The liquid, microparticle and gas solution are referred to as a nanofoam liquid ("NL").

The functionality of the present apparatus will now be discussed with reference to FIGS. 8-16. Forced liquid flow in hydrophobic nanochannels or nanopores 79 is employed as a mechanism for energy storage and mitigation in the solution. In the present apparatus, the liquid molecules 71 are forced into nanopores 79 when the applied external load is sufficient to overcome the capillary force. As the external load is removed, the intruded liquid can be fully or partially expelled from the hydrophobic nanopores. A tremendous amount of energy is mitigated by the solution due to its highly hysteretic mechanical response. With the liquid outflow, the present apparatus recovers its energy mitigation capacity and is capable of mitigating repetitive impacts as can be observed in FIG. 14. The system recoverability of the solution is determined by the degree of liquid outflow from the hydrophobic nanopores during the load releasing process.

The liquid outflow behavior in nano-environment is related to an excessive liquid-solid interfacial tension, nanoporous structure, and liquid-gas interaction. The effect of liquid-solid interaction on liquid outflow from hydrophobic nanopores in the absence of a gas phase is explained by the nanoscale vapor bubble nucleation theory. During an unloading process, hydrophobic confinement facilitates the nucleation and growth of a vapor cavity, which is accompanied by a continuous outflow of a confined liquid phase. In addition to the liquid-solid interaction in the present apparatus, the liquid-gas interaction in the nano-environment significantly affect the nanoscale liquid outflow. Gas molecules makes the confined liquid unstable and the gas molecules in the nanopores tend to form clusters and trigger liquid outflow. Reduced gas solubility in the bulk liquid phase combining with enhanced gas oversolubility in the confined liquid phase preserves more gas molecules 75 in the nanopores and endows the solution with a higher degree of liquid outflow. Oversolubility effects refer to a large increase (a factor of 5~2000) of the gas solubility in liquids confined in nanopores with respect to the value predicted by Henry's law. The present apparatus employs fast gas saturation of the bulk liquid and the enhanced bubble nucleation in the hydrophobic nanopores suppress gas outflow but promote liquid outflow.

Example #1: 1 g of silica gel is mixed with 40 mL of anhydrous toluene. 10 mL of chloro(dimethyl)octylsilane and 1 mL of pyridine are then injected into the mixture. The mixture is gently stirred at 95° C. for 18 h, after which the surface-treated silica gel was filtered, washed with ethanol, and dried for at least 24 h before use. The liquid phase of the solution is de-ionized ("DI") water.

Figure 18:
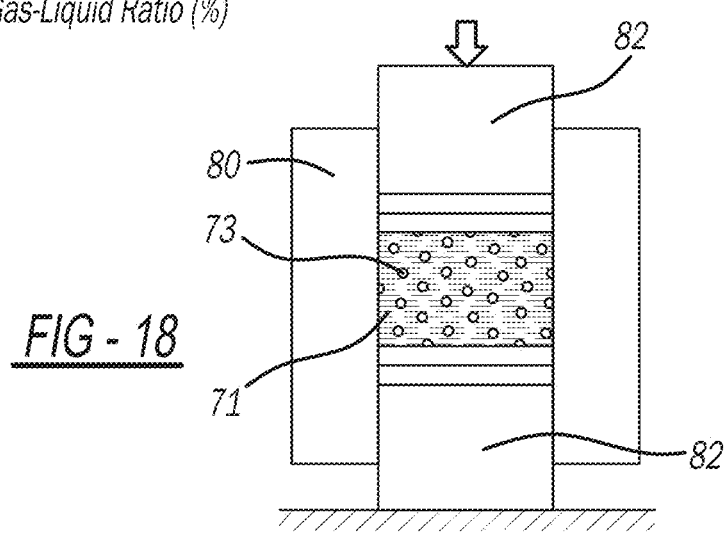
FIG. 18 is a diagrammatic, cross-sectional view showing a test equipment setup for use with the present apparatus.
Figure 19:
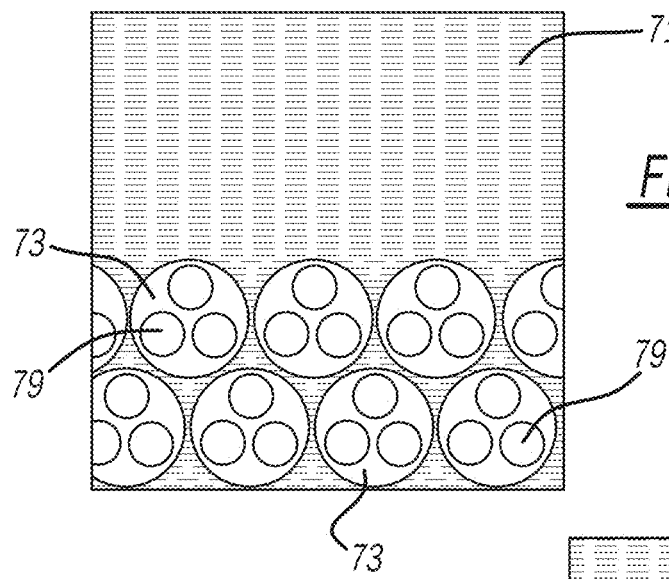
FIGS. 19-22 are a series of diagrammatic, cross-sectional views showing the present apparatus in different test conditions.
Figure 20:
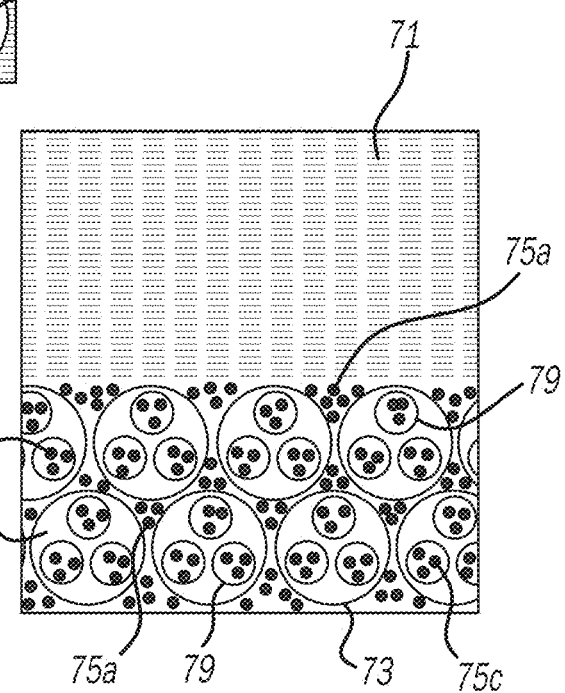
Figure 21:
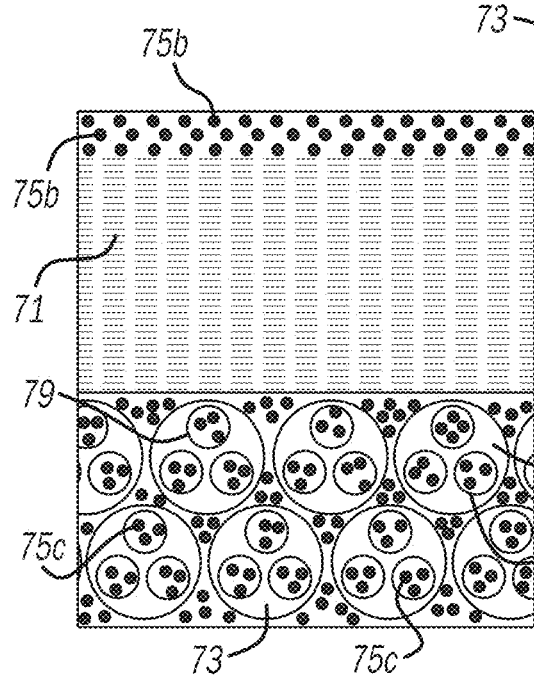
Figure 22:
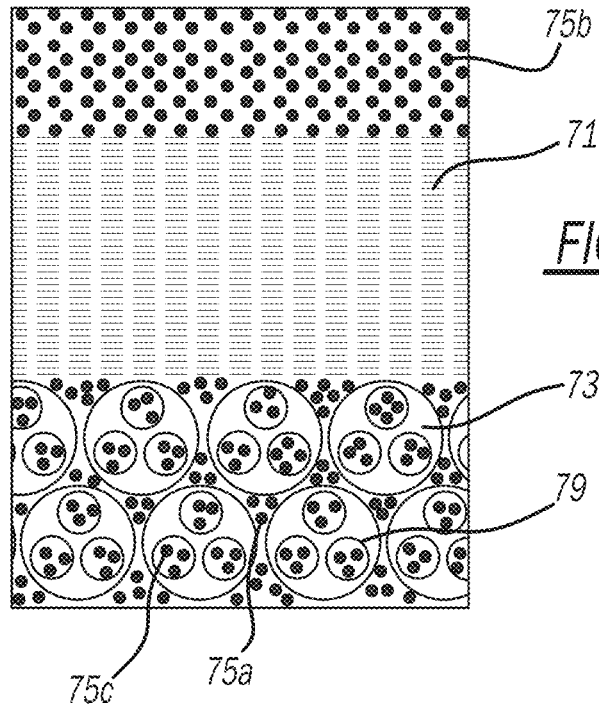

Referring to FIGS. 2, 18 and 19, the sample is prepared by sealing 0.2 g of surface-treated silica gel microparticle 73 and 1.5 mL of DI water 71 in a stainless-steel testing cell 80 between two, aligned O-ring equipped pistons 82. The cross-sectional area A of pistons 80 is 286 $mm^2$. Four types of samples, having the same amount of silica gel and DI water 71 but different amounts of the gas phase, denoted as LN-V, are prepared by placing the mixture in a vacuum (<3 KPa) for several hours to minimize the amount of air in nanopores 79 and the bulk liquid phase 71. The samples, prepared at ambient condition without degassing, are denoted as LN-N, and contains a small amount of air 75a trapped in between hydrophobic silica gel microparticles 73 as is shown in FIG. 20. Referring to FIG. 21, extra gas 75b is introduced and injected into bulk liquid 71 by sealing an additional air column in the testing cell, thereby forming samples LN-EL and LN-EM. In summary, FIG. 19 shows the degassed sample, LN-V; FIG. 20 shows the sample without degassing, LN-N; FIG. 21 shows the sample with lower amount of extra gas, LN-EL; and FIG. 22 shows the sample with higher amount of extra gas, LN-EM. The detailed sample information is summarized in the following Table 1. It is alternately envisioned that one or more pistons may be used to pre-pressurize the solution within the pouch, in its ambient condition, before it is coupled to the exterior shell or wall.

The volume of gas 75c in the nanochannels is calculated as $V_i = m \cdot V_{sp}$, where m and $V_{sp}$ are the mass and specific pore volume of the silica gel, respectively. The volume of extra gas 75b in liquid 71 is determined by $V_o = A \cdot l - (V_{DI} + m/\rho + V_i)$, where l is a total length of the sealed sample, $V_{DI}$ is a volume of DI water, and ρ is a density of silicon dioxide. The gas to liquid volume ratio of the prepared samples at ambient condition is calculated as $\phi = (V_i + V_o)/V_{DI}$.

TABLE 1

| Sample | m | $V_{DI}$ | $V_i$ | $V_o$ | Pd | φ |
|---|---|---|---|---|---|---|
| LN-V | 0.2 g | 1.5 mL | 0 | 0 | 0 | 0 |
| LN-N | 0.2 g | 1.5 mL | 0.14 mL | 0.08 mL | 0.3 MPa | 15% |
| LN-EL | 0.2 g | 1.5 mL | 0.14 mL | 0.75 mL | 2.9 MPa | 60% |
| LN-EM | 0.2 g | 1.5 mL | 0.14 mL | 1.95 mL | 7.7 MPa | 140% |

The samples sealed in the testing cell are compressed by a universal tester at a speed of 2 mm/min. For each type of LN, three samples are tested. The applied force, F, increases gradually to 10 kN, leading to an equivalent pressure of 35 MPa in the testing cell. As the peak force is reached, the tester crosshead is moved back at the same speed. To study the liquid outflow behavior of the solution, the compression test is repeated at least three times for each sample. The hydrostatic pressure in the testing cell is calculated as P=F/A and the specific volume change of the sample is calculated as ΔV=A·δ/m, where δ is the measured piston displacement and m is the mass of the silica gel microparticles.

Figure 23:
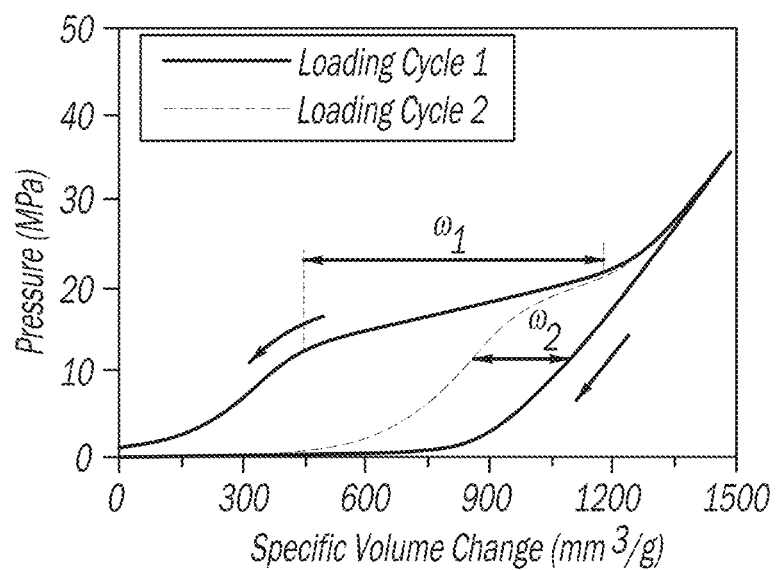
FIGS. 23 and 24 are pressure versus specific volume change graphs for the present apparatus.
Figure 24:
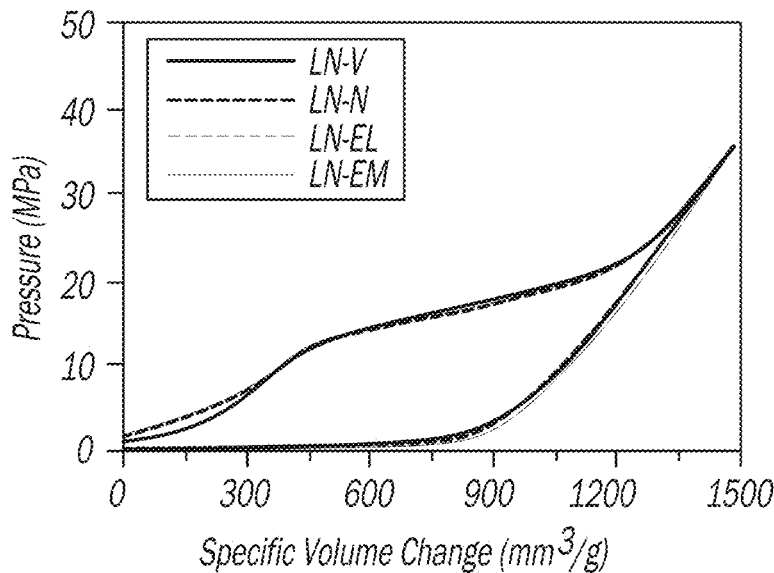
Figure 25A:
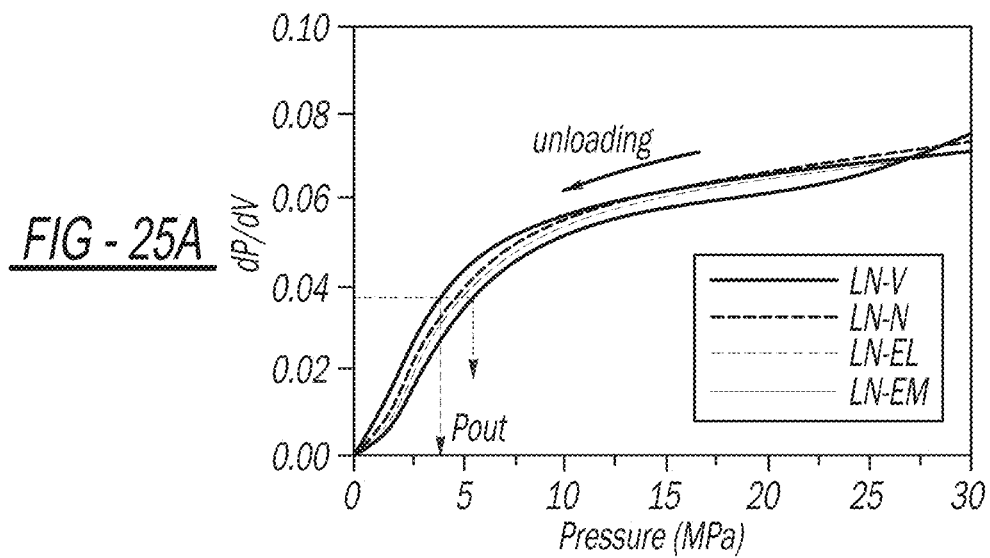
FIGS. 25A and 25B are unloading curve graphs for the present apparatus.
Figure 25B:
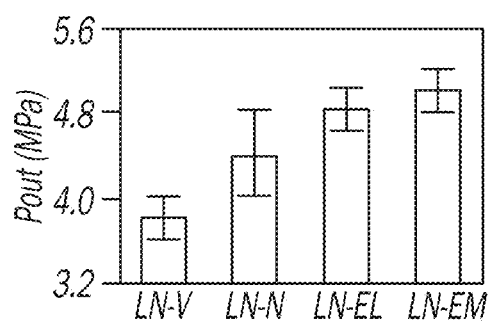
Figure 26:
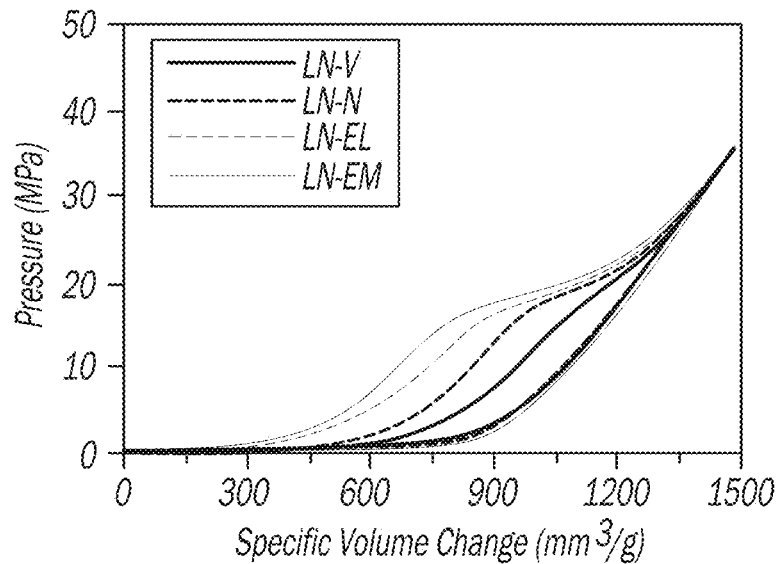
FIG. 26 is a pressure versus specific volume change graph for the present apparatus.

Expected quasi-static compression testing results of different samples of the present apparatus are illustrated in: FIG. 23 as a typical consecutive loading-unloading cycles of the sample; FIG. 24 as a typical first loading-unloading cycles of different samples; FIGS. 25A and 25B as a reduced slope of the unloading curves in the first cycles of different samples; and FIG. 26 as a typical second loading-unloading cycles of different samples. More specifically, FIG. 23 shows only the first and second loading-unloading cycles since all subsequent cycles are nearly identical to the second one. Referring now to FIGS. 3 and 8, at ambient condition, water molecules 71 stay outside of the nanopores 79 of microparticles 73 due to the surface hydrophobicity and the air molecules 75c. An initial small impact force 91 is absorbed by the flexibility of pouch 55 and lateral movement of liquid 71 therein, as can be viewed in FIG. 4. Subsequently, as a greater external force 91 is applied (see FIGS. 5, 9 and 23), initially, the mechanical response of the solution is nearly elastic and the system bulk moduli is contributed by both liquid and solid compositions. When the pressure reaches approximately 13 MPa, the FIG. 23 slope of the loading curve shows considerable reduction and an infiltration plateau with the smallest slope of the loading curve is formed. This corresponds to the water molecules 71 being forced into the nanopores 79, referred to as the liquid infiltration process, as can be observed by comparing FIGS. 4 and 9 to subsequent FIGS. 5 and 10.

The pressure at which liquid infiltration occurs is defined as the liquid infiltration pressure, $P_{in}$, which is governed by the Laplace-Young equation, $P_{in}=2\Delta\gamma/r$, where Δγ is the excessive solid-liquid interfacial tension and r is the nanopore radius. As all the nanopores are filled with water molecules, the liquid infiltration plateau ends as indicated by the next turning point at 22 MPa. The effective nanochannel volume of the LN, which is determined by the width of the infiltration plateau cui, is around 730 mm³/g. Thereafter, the system becomes elastic again. Upon unloading (comparing FIGS. 6 and 11 to subsequent FIGS. 7 and 12), the pressure drops quickly in a linear manner at the beginning. As the pressure further reduces, the slope of the unloading curve starts to decrease.

In FIG. 23, the reduced slope of the unloading curve as well as the associated specific volume change indicate the combined liquid and gas outflow from the hydrophobic nanochannels. When the external pressure is removed, both confined gas 75c and liquid molecules 71 start to flow out from nanopores 79. A quantity of the outflowing liquid volume can be determined from a width of a liquid infiltration plateau in the second loading-unloading cycle. In the second cycle, the apparatus shows similar hysteric loading-unloading response, however, compared with the first cycle, $P_{in}$ is increased while the width of the infiltration plateau, $\omega_2$, is much smaller. The reduced infiltration plateau width suggests that only partial nanopore volume is available in the second cycle, which is due to the partial liquid outflow from the nanopores in the first cycle. The volume of the liquid outflow is equivalent to the volume of gas retained in the hydrophobic nanopores. Therefore, the degree of liquid outflow from nanopores or the degree of gas retention in the nanopores, $\eta_{out}$, is defined as:

$$\eta_{out}=\omega_2/\omega_1 \quad (1)$$

FIG. 24 shows typical first loading-unloading cycles of four samples where the curves are shifted along an x-axis for better comparison. During the loading process, the mechanical response of four samples is nearly the same; in other words, neither the effective pore volume $\omega_1$ nor the liquid infiltration pressure $P_{in}$ of the solution is affected by the considerably increased amount of gas phase. Since all the samples possess the same $P_{in}$, according to the Laplace-Young equation, the excessive surface tension at the solid-liquid-gas interface is a constant. The additional gas content has negligible effect on the interfacial tension and the constant solid-liquid-gas interface is attributed to the hydrophobic nanopore surface.

Furthermore, as water molecules meet the hydrophobic surface, a thermodynamically driven depletion layer is formed. In the depletion layer, the low-density hydrogen bonds are highly orientated, preclude the existence of gas molecules, and dominate the solid-liquid-gas interface. Thus, the dissolved gas molecules exhibit negligible effects on the interfacial tension. During unloading, the fast-linear reduction in system pressure ends at a higher pressure when the sample contains larger gas volume. The above described identical loading process and difference in unloading process, indicate that the additional gas volume in the present apparatus has a prominent effect on the combined gas and liquid outflow from the hydrophobic nanopores.

TABLE 2

| Sample | $\omega_1$ (mm³/g) | $\omega_2$ (mm³/g) | $\eta_{out}$ (%) | $P_{out}$ (MPa) |
|---|---|---|---|---|
| LN-V | 730 ± 9 | 119 ± 8 | 16 ± 1 | 3.8 ± 0.2 |
| LN-N | 732 ± 7 | 232 ± 11 | 32 ± 1 | 4.4 ± 0.4 |
| LN-EL | 736 ± 9 | 330 ± 13 | 45 ± 2 | 4.8 ± 0.2 |
| LN-EM | 727 ± 7 | 407 ± 17 | 56 ± 2 | 5.0 ± 0.2 |

When the linear unloading ends, the system volume expands more with unit pressure reduction. This indicates confined gas and liquid molecules flow out from the nanopores and the corresponding pressure is defined as an outflow pressure, $P_{out}$. To further quantify $P_{out}$, a slope of the unloading curves (dP/d V) is plotted versus the system pressure in FIGS. 25A and 25B. Table 2 discloses a measured effective pore volume and calculated degree of liquid outflow of different samples.

Figure 27:
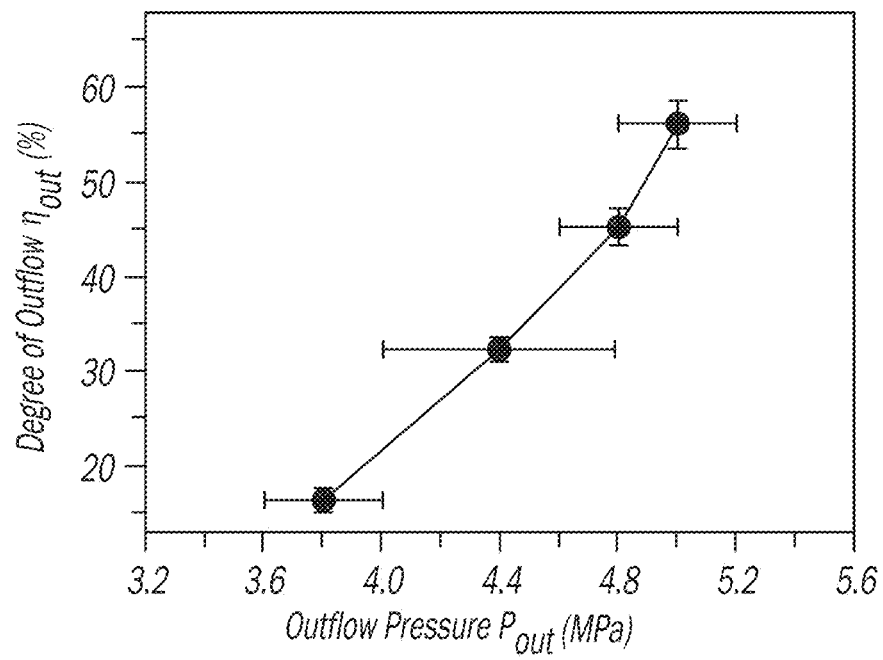
FIG. 27 is a degree of outflow versus outflow pressure graph for the present apparatus.
Figure 28:
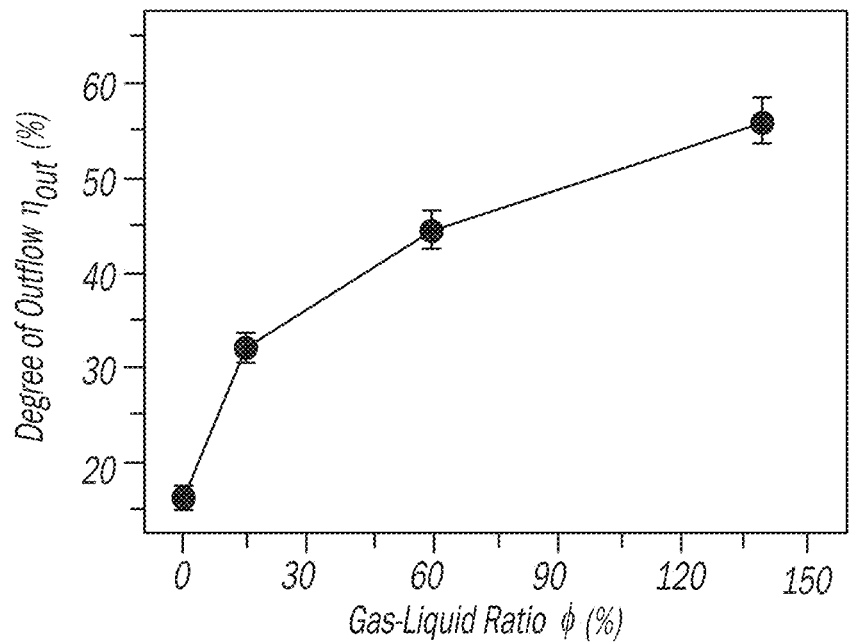
FIG. 28 is a degree of outflow versus gas-liquid ratio graph for the present apparatus.

An increased $V_o$ reduces the effective bulk modulus of the resulted samples, which is validated by the reduced slope from 30 MPa to 15 MPa. $P_{out}$ is quantified when the slope (dP/d V) is reduced to 0.35 and increases from 3.8 MPa (LN-V) to 5.1 MPa (LN-EM) with increasing φ (see FIG. 25B and Table 2). Concurrently, $\omega_2$ monotonically increases with increasing φ (see FIG. 26 and Table 2). Since all the samples have similar ω₁, η_out increases from 16% to 56% with the promoted P_out (see FIG. 27 and Table 2), as φ increases from 0 to 140% (see FIG. 28). The degree of liquid outflow is significantly enhanced by the only system variable, i.e. the extra gas in the solution.

Figure 9:
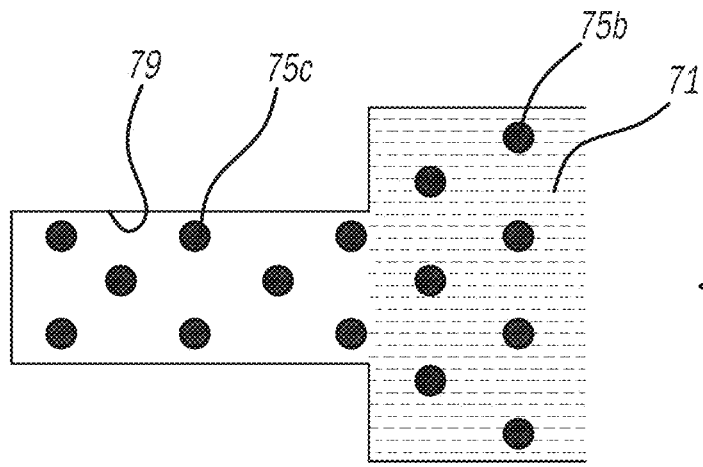
Figure 10:
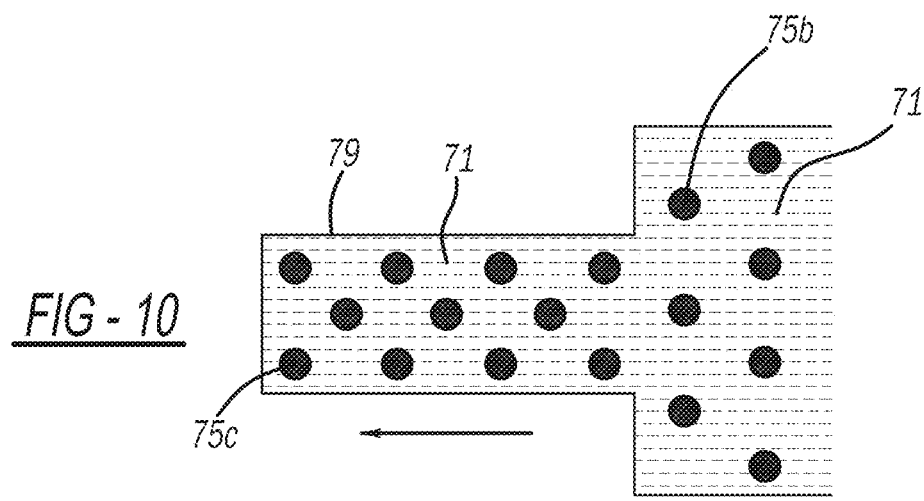
Figure 17:
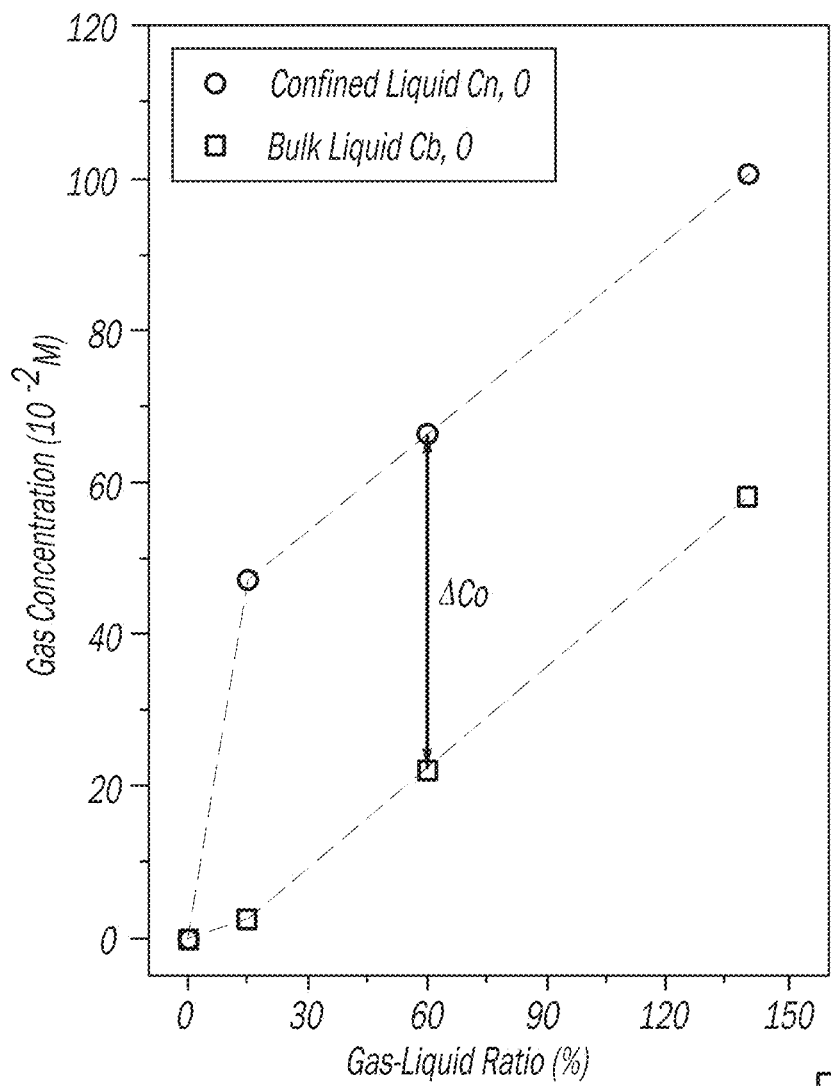
FIG. 17 is a gas concentration versus gas-liquid ratio graph for the present apparatus.

At the molecular level, as all the samples have identical excessive solid-liquid interfacial tension, the variation in $\eta_{out}$ is attributed to the enhanced liquid-gas interaction in the nanopores in the unloading process. FIGS. 8-10 illustrate that during the loading (i.e., impact absorption) process, the system pressure gradually increases and gas molecules 75b are dissolved into the bulk and confined liquid phases in a stepwise manner. First, gas 75b outside nanopores 79 are dissolved into the bulk liquid 71, which can be observed by comparing FIGS. 8 and 9. According to Henry's law, the bulk gas solubility is proportional to the system pressure:

$$C_g = P_g/k_{H,T} \tag{2}$$

where $C_g$ is gas solubility in bulk liquid, $P_g$ is partial pressure of gas, and $k_{H,T}$ is Henry's coefficient at temperature T. At 1 atm, the air solubility is $7.6 \times 10^{-4}$ M. The pressure at which all the extra air molecules outside nanopores are dissolved into the bulk liquid phase, denoted as $P_d$, is calculated and summarized in Table 1. $P_d$ is much smaller than the infiltration pressure $P_{in}$. Therefore, all the air molecules outside nanochannels are fully dissolved into the bulk liquid phase before liquid infiltration occurs. During the liquid infiltration process, as shown by comparing FIGS. 9 and 10, the bulk liquid phase (both the water and the dissolved air molecules) starts to enter the nanopores and dissolves the confined air molecules 75c. This full impact condition is also illustrated in FIG. 6. The gas solubility in the confined liquid phase in the nanopores, also known as gas oversolubility, is more than ten times greater than the solubility in the bulk liquid phase. Therefore, all air molecules inside the nanopores are fully dissolved by the intruded liquid phase. The calculated gas concentration in the bulk liquid $c_{b,0}$ as well as in the nanopores $c_{n,0}$ are summarized in Table 3 and plotted in FIG. 17. The values of $c_{b,0}$ and $c_{n,0}$ increase with φ, while the concentration difference $\Delta c_0 = (c_{b,0} - c_{n,0})$ is a constant. As shown in Table 3, for LN-EM sample with the highest amount of gas, $c_{n,0}$ is only ~2 times of $c_{b,0}$, indicating that the confined liquid phase in the nanochannels is far from saturation.

TABLE 3

| Sample | $c_{b,0}$ (M) | $c_{n,0}$ (M) | $\Delta c_0$ (M) |
|---|---|---|---|
| LN-V | 0 | 0 | 0 |
| LN-N | $2.4 \times 10^{-3}$ | $4.7 \times 10^{-2}$ | $4.4 \times 10^{-2}$ |
| LN-EL | $2.2 \times 10^{-2}$ | $6.7 \times 10^{-2}$ | $4.4 \times 10^{-2}$ |
| LN-EM | $5.8 \times 10^{-2}$ | $1.0 \times 10^{-1}$ | $4.4 \times 10^{-2}$ |

Figure 13:
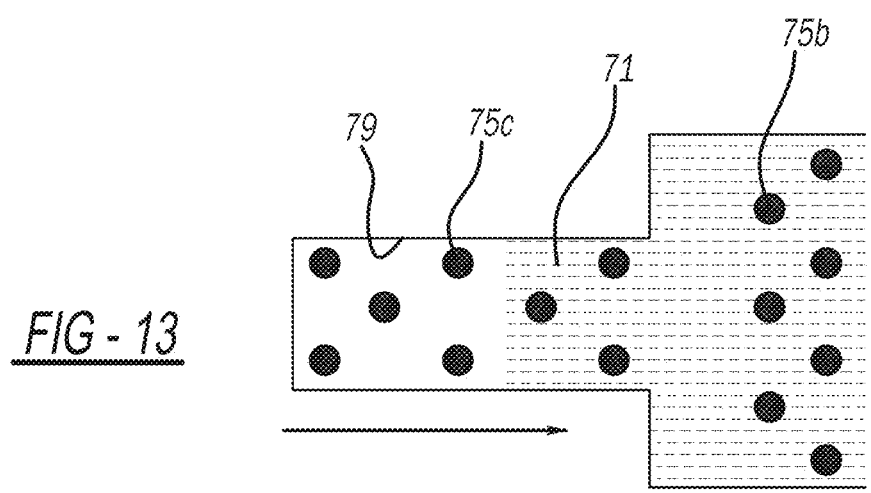
Figure 14:
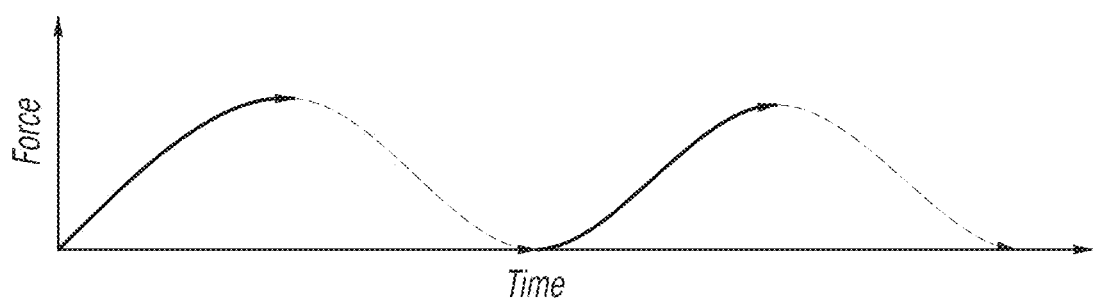
FIG. 14 is a force versus time graph for the present apparatus showing repeated external loading.
Figure 15:
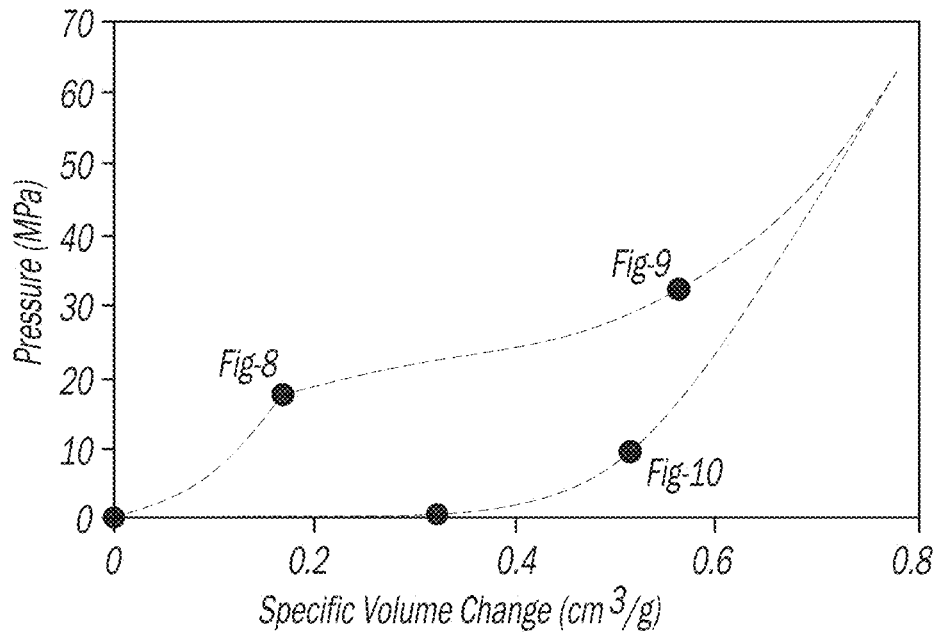
FIGS. 15 and 16 are pressure versus specific volume change graphs for the present apparatus.
Figure 16:
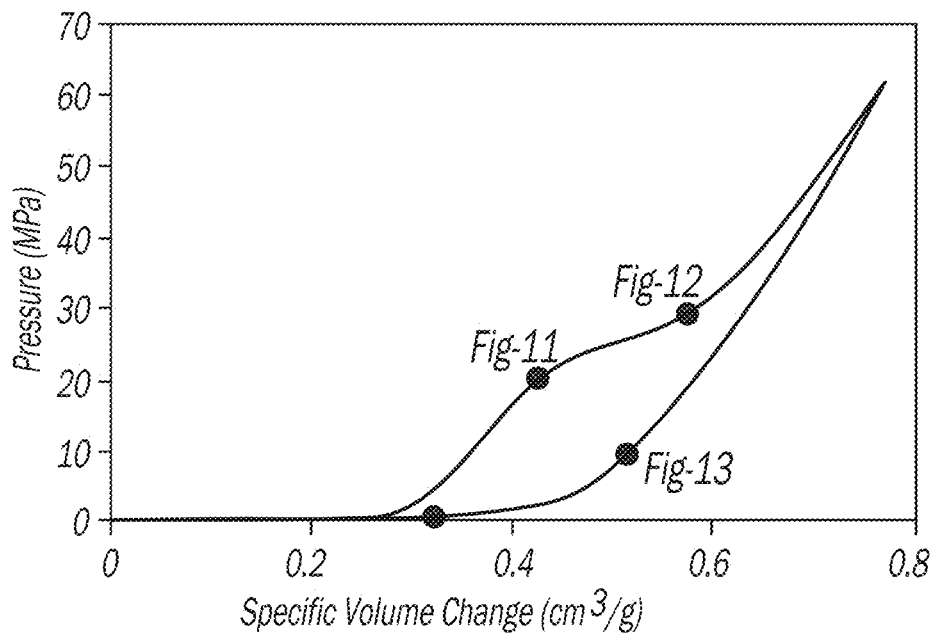

When the unloading process begins, as can be observed in FIGS. 6, 13 and 24, the initial linear response is due to the linear volume expansion of the bulk liquid phase resulted from the reduced system pressure. As the total volume change of the solution is small and the sudden pressure drop (~20 MPa reduction in 5 s), the liquid outflow from the nanopores to the bulk liquid phase is limited and negligible.

When the linear unloading ends (dP/V≈0.06 shown in FIGS. 25A and 25B), instead of the linear volume expansion, the combined liquid and gas outflow from the nanopores to the bulk liquid phase dominates the system volume recovery. Particularly, the gas outflow includes gas diffusion and advection from the nanochannels to the bulk liquid phase. As stated in Fick's law, the gas diffusion flux is directly proportional to the concentration gradient. Since $\Delta c_0$ is a constant for all samples except LN-V, the initial gas molecules diffusion rates are exactly the same. In addition, the gas diffusion is a slow process, given the unloading process is completed in less than a minute, the amount of gas diffusing from the nanopores to the bulk liquid phase can be ignored in the computation.

Figure 11:
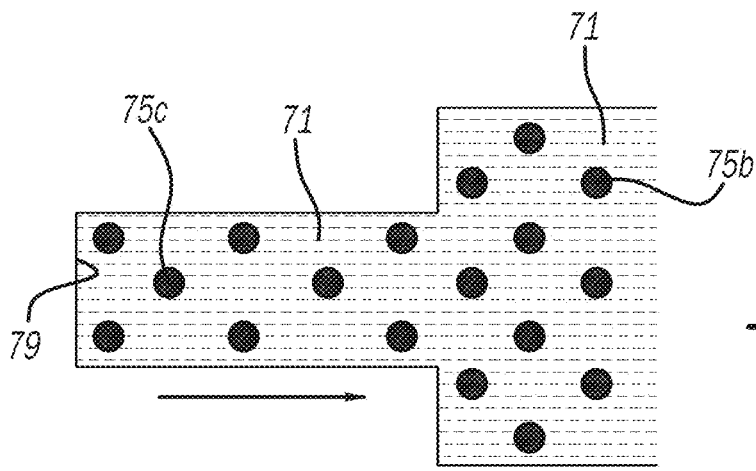
Figure 12:
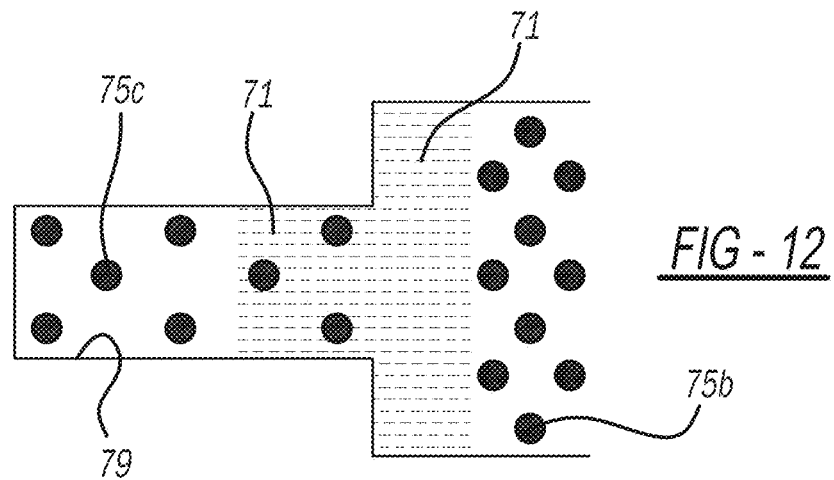

The gas advection is defined as the dissolved gas molecules flow out from the nanopores to the bulk liquid phase with the liquid, driven by the increased intermolecular spacing in the nanopores. The gas advection flux is proportional to the mass transfer velocity and the gas concentration at the interface between nanopores and the bulk liquid phase. Since the system volume recovery is controlled at a constant rate (2 mm/min), the initial mass transfer velocities of all samples are the same. The advection-induced gas concentration reduction is:

$$\Delta c_{n,a}(t) = \int_0^t k_a(\tau) \cdot c_n(\tau) d\tau \tag{3}$$

where $k_a$ is a time-dependent parameter and $c_n$ is the gas concentration in liquid confined in the nanochannels at time τ. FIGS. 11-13 show the gas outflow process leads to gas concentration decrease in the confined liquid and increase in the bulk liquid.

Given the large and quick pressure drop in the linear unloading process, the bulk gas solubility is reduced accordingly based on the Henry's law. Therefore, the gas molecules escaped from the nanopores quickly saturate the bulk liquid phase. As the bulk liquid phase is not capable of accommodating more gas molecules, the gas outflow from the nanopores is blocked (see FIG. 9). The pressure, at which the gas saturation occurs, is defined as the blocking threshold pressure of gas outflow, $P_t$, and given $c_{n,0} \geq c_{b,0}$, the liquid flowing out from the nanopores has a higher gas concentration than that of the liquid intruding into the nanopores during the loading process. Therefore, with the additional gas outflow, the bulk liquid phase is saturated at higher pressure ($P_t > P_d$) for a given solution. Moreover, the total time needed to saturate the bulk liquid phase is defined as the threshold time of gas outflow, $t_0$. When the bulk liquid is saturated during the unloading process, the bulk gas concentration is:

$$c_b(t_0) = c_{b,0} + \frac{V_1}{V_{Dl} - V_1} \Delta c_{n,a} = P_t / k_{H,T} \tag{4}$$

Accordingly, for samples with extra gas, both $c_{b,0}$ and $\Delta c_{n,a}$ increases with φ and for the LN-V sample, the gas content in the LN-V has been minimized and the bulk phase will never be saturated with gas, i.e. $P_t^{LN-V} = 0$. From Equation (4), $P_t^{LN-EM} > P_t^{LN-EL} > P_t^{LN-N} > P_t^{LN-V}$. The total gas amount is conservative since the samples are completely sealed, and the gas amount increase in the bulk phase is equivalent to the gas amount decrease in the nanopores. Therefore, when the bulk liquid is saturated during the unloading process, the gas concentration in the nanopores is:

$$c_n(t_0) = c_{n,0} - \Delta c_{n,a} \tag{5}$$

More gas molecules are retained in the confined liquid since the gas outflow is ceased at a higher threshold pressure, i.e. $c_{n,t}^{LN-EM} > c_{n,t}^{LN-EL} > c_{n,t}^{LN-N} > c_{n,t}^{LN-V}$. At the threshold pressure, although the bulk liquid has been saturated, the gas remained in the nanopores are still dissolved by the confined liquid due to the oversolubility in the nano-environment. It is noteworthy that the gas oversolubility factor in the nanopores causes the following bubble nucleation, as more gas molecules are preserved in the nanopores during the unloading process. Hence, both $P_t$ and $c_n$ ($t_0$) increase with φ.

The free energy of the confined liquid in the nanopores starts to increase with system pressure reduction once the gas outflow ceases. To maintain the minimum system free energy, liquid-gas phase separation takes place in the nano-environment, thereby creating bubble nucleation. The formation of a vapor nucleus increases the system free energy by: (i) $\gamma_{sv}A_{sv}$, where $\gamma_{sv}$ is the solid-vapor interfacial tension and $A_{sv}$ is the solid-vapor interface area; (ii) $\gamma_{lv}A_{lv}$, where $\gamma_{lv}$ is the liquid-vapor interfacial tension and $A_{lv}$ is the liquid-vapor interface area; and (iii) $P_{out}V$, where $P_{out}$ is the liquid outflow pressure and V is the volume recovery of the system. On the other hand, the system free energy is reduced due to the surface hydrophobicity by $\Delta\gamma A_{ls}$, where $A_{ls}$ is the liquid-solid interface area. Thus, a thermodynamic equilibrium is expressed as:

$$\gamma_{sv}A_{sv}+\gamma_{lv}A_{lv}+P_{out}V=\Delta\gamma A_{ls} \quad (6)$$

The above equilibrium describes the phase separation process in the confined nano-environment. However, the gas phase, which has strong interaction with the confined liquid and influences the liquid outflow behavior, exists. In this case, the confined gas solution becomes supersaturated given that no gas molecules exist in the vapor bubble. Based on Henry's law, the excessive gas molecules tend to separate from the confined liquid into the vapor phase, releasing the system free energy by $P_g V_g = C_{n,t} k_{H,T} V_g$, where $V_g$ is gas volume separated from the confined liquid phase. Then, the above thermodynamic equilibrium equation is modified as:

$$\gamma_{sv}A_{sv}+\gamma_{lv}A_{lv}+P_{out}V=\Delta\gamma A_{ls}+C_{n,t}k_{H,T}V_g \quad (7)$$

from which the liquid outflow pressure is calculated as:

$$P_{out} = \frac{k_{H,T}V_g}{V}C_{n,t} + \frac{\Delta\gamma A_{lv} - \gamma_{sv}A_{sv} - \gamma_{lv}A_{lv}}{V} \quad (8)$$

$P_{out}$ is promoted by the retained gas concentration in the confined liquid. The supersaturation limit pressure increases with the increase of dissolved gas concentration in bulk liquid. Thus, the bubble nucleation in the nanopores is initiated at the pressure $P_{out}$, which has a higher value in a sample containing higher gas content. As the system pressure reduces, the formed bubble continuously grows at the gas-liquid interface which has the lowest energy barrier. The bubble growth and expansion in the nanochannels is a driving force of liquid outflow, pushing the confined liquid out of the hydrophobic nanochannels. In the bulk phase, when the system pressure reduces to a certain pressure level, the bulk liquid phase is saturated with gas. Since then, the bulk liquid phase is always saturated, forming a high energy barrier and blocking the gas outflow from the nanopores. Accordingly, the further reduced system pressure leads to gas precipitation and bubble formation in the bulk liquid phase following Henry's law.

Based on the above analysis, when the unloading starts, the gas and liquid molecules flow out from the nanopores to the bulk liquid. The gas outflow is blocked once the bulk phase is saturated, while the liquid outflow continues. For the sample containing higher gas content, the gas outflow suppression as well as bubble nucleation occur at a higher threshold pressure due to the faster bulk liquid saturation and the enhanced liquid-gas interaction in the gas-supersaturated liquid in the nanopores. Consequently, the higher system free energy reduction resulted from the releasing of gas molecules from confined liquid to vapor phase drives more liquid out, leading to a higher $\eta_{out}$.

In summary, the degree of liquid outflow from hydrophobic nanopores is a function of the amount of gas in the solution. Higher amount of gas blocks the gas outflow at a higher threshold pressure, and thus, retains more gas molecules in the nanopore. The additionally retained gas molecules promotes the bubble nucleation process and results higher degree of liquid outflow thereby improving the ability of the microparticles to absorb repetitive subsequent impact forces and significantly increasing reusability of the energy absorbing apparatus.

A configuration of the present energy absorbing apparatus with the optional inclusion and effect of electrolytes on liquid outflow, will now be described. For this embodiment, nanopore diameters greater than 6 nm, and more preferably 8-120 nm, are preferred. Ion concentration in the electrolyte solution beneficially influences both excessive solid-liquid interfacial tension and gas oversolubility. The effect of gas oversolubility is herein decoupled from the effect of excessive solid-liquid interfacial tension by adjusting the concentration of different electrolytes to keep the surface tension of all liquid phases the same.

Example #2: The exemplary nanoparticle material is a surface-modified nanoporous silica gel (such as Fluka 100 $C_8$ which may be obtained from Sigma Aldrich). The microparticles are in powder form, and the diameter is in the range of 40-63 μm. The naturally hydrophilic siliceous surface has alkyl chains creating a hydrophobic exterior surface. The specific surface area and pore volume of the average microparticles are 227 m²/g and 0.43 cm³/g, respectively. Four types of aqueous electrolyte solutions, with same surface tension, are prepared at 23° C. based on the linear relationship between molar concentration of electrolytes and surface tension of resulted aqueous solutions. The corresponding molar concentrations of the electrolytes used in this study are 3.04 M NaCl, 3.37 M LiCl, 3.43 M NaBr and 3.84 M LiBr.

To prepare the specimens, 0.2 g of the hydrophobic silica gel is firstly placed at the bottom of a 316-stainless-steel cell 80 as depicted in FIG. 18. Then, 2.3 mL of aqueous electrolyte solution is slowly dropped into the cell by a glass Pasteur pipette. Once the cell is filled by the samples, it is sealed by an O-ring fixed on a 316-stainless-steel piston 82 with a diameter d of 12.7 mm.

The sealed testing cell is placed on the platen of a universal tester and compressed at the speed of 2 mm/min. As an external force F is applied on the cell, a hydrostatic pressure P is built in the testing cell and applied on the sealed solution. When the applied load reached 8 kN (equivalent to 63 MPa), the load cell of the machine is moved back at the same speed. The externally applied hydrostatic pressure is calculated as $P=4F/\pi d^2$. The specific volume change of the solution is calculated as $V=\Delta\cdot\pi d^2/4m$, where Δ and m were the measured displacement of the piston and the mass of the nanoporous silica gel, respectively. The loading-unloading cycles are repeated three times for each specimen.

Figure 29A:
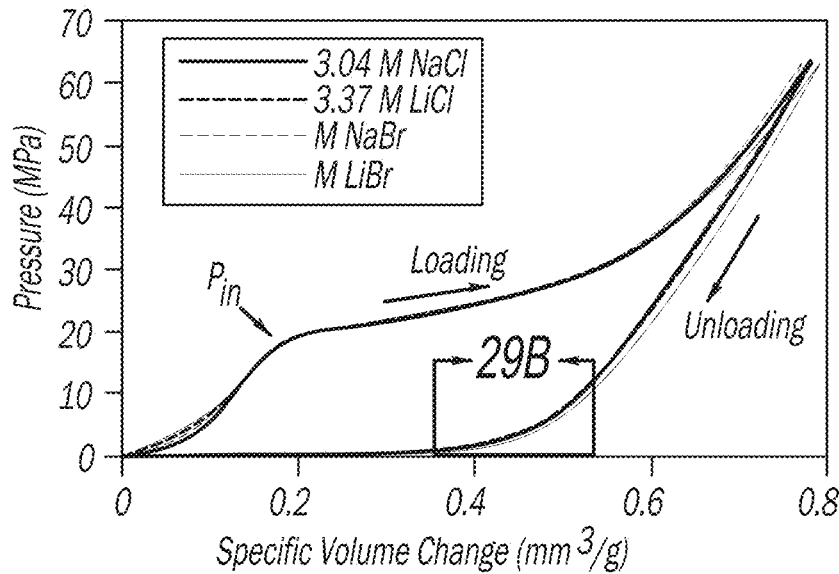
FIGS. 29A, 29B, and 30-34 are pressure versus specific volume change graphs for the present apparatus.
Figure 29B:
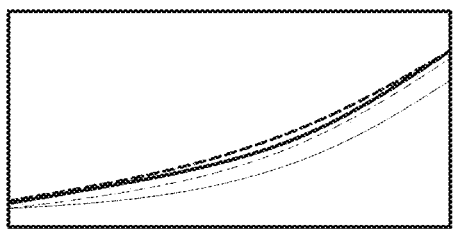

FIGS. 29A and 29B show typical first loading-unloading cycles of specimens containing different aqueous electrolyte solutions. During the loading process, the initial response of all specimens is linear elastic, as the externally applied hydrostatic pressure is not high enough to overcome the surface energy barrier between the hydrophobic nanopore surface and the non-wetting aqueous electrolyte solutions. As the pressure increases to the liquid infiltration pressure ($P_{in}$, ~17 MPa), the pressure of the first turning point of the loading curve, the liquid molecules are forced into and fill the nanopores. The force-aided liquid filling process and the resulted pressure plateau are referred to as liquid infiltration and the liquid infiltration plateau, respectively. The relationship between the excessive solid-liquid interfacial tension, $\Delta\gamma$, and $P_{in}$ can be described by the Laplace-Young equation as $P_{in}=4\Delta\gamma/d_n$, where $d_n$ is the nanopore diameter. Upon the completion of nanopore filling, the slope of the loading curves quickly increases to a value that is slightly higher than the initial elastic one. As the nano-channels are filled with liquid, the nanoporous silica gel is turned into its solid counterpart, which has larger Young's and bulk moduli.

The specimens have same excessive solid-liquid surface tension since they possess the same $P_{in}$ and the liquid infiltration plateau. The same excessive solid-liquid surface tension is also confirmed by the same surface tension of all four aqueous electrolyte solutions, ~77 mN/m, measured by a tensiometer. Furthermore, combining the same porous structure and surface condition of the nanopores, all of the specimens have same excessive solid-liquid surface tension.

FIGS. 29A and 29B show that during unloading, the internal pressure of the specimens drops linearly with small volume change at the beginning. A transition zone having a reduced slope is observed with further reduction in the internal pressure. The much reduced slope of the unloading curve as well as the associated large specific system volume change suggest that the confined liquid and gas molecules in the hydrophobic nanopores start to flow out. The variation of the pressure associated with the transition zone (see FIG. 29B) indicating the influence of the electrolyte types on liquid outflow behavior.

Figure 30:
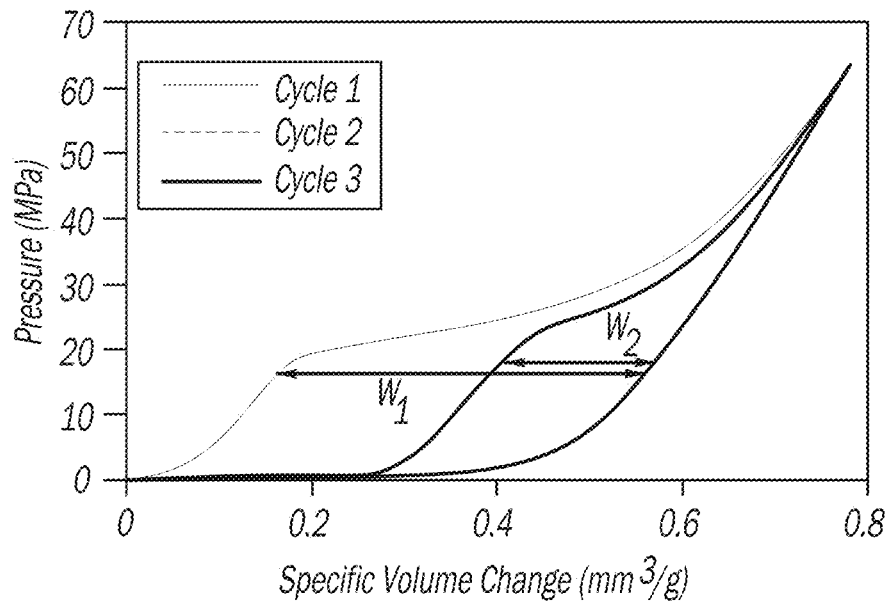
Figure 31:
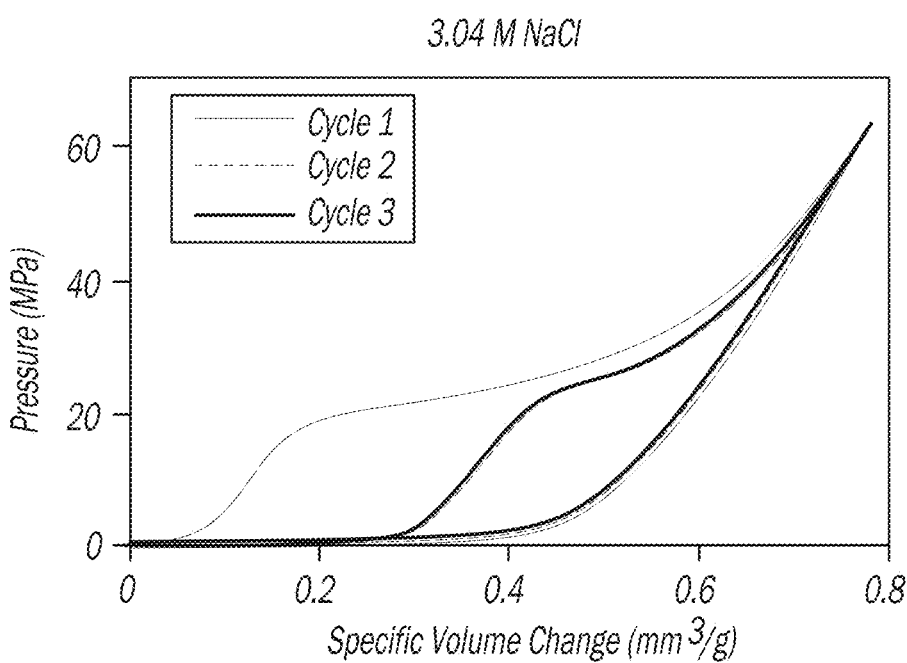
Figure 32:
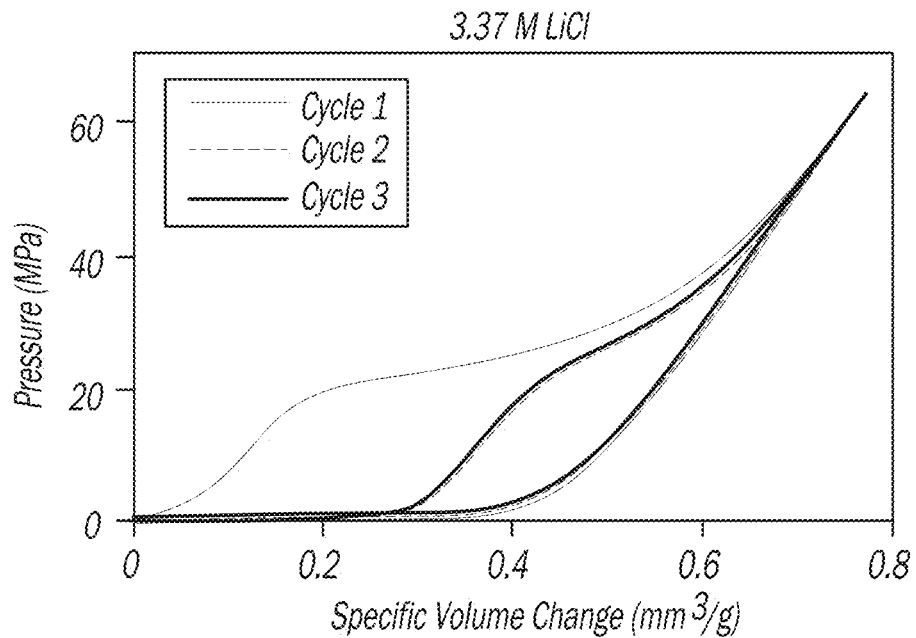
Figure 33:
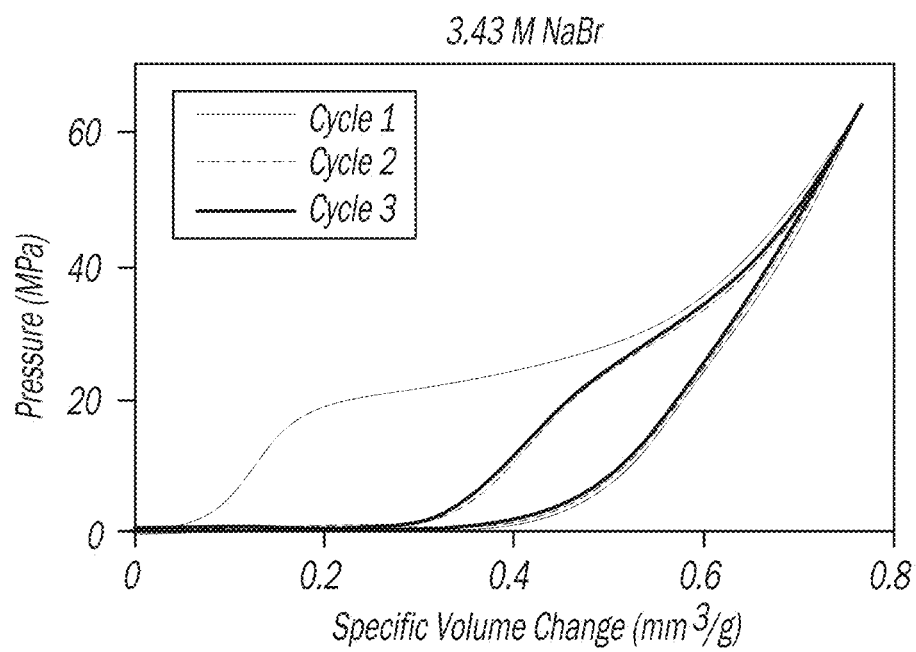
Figure 34:
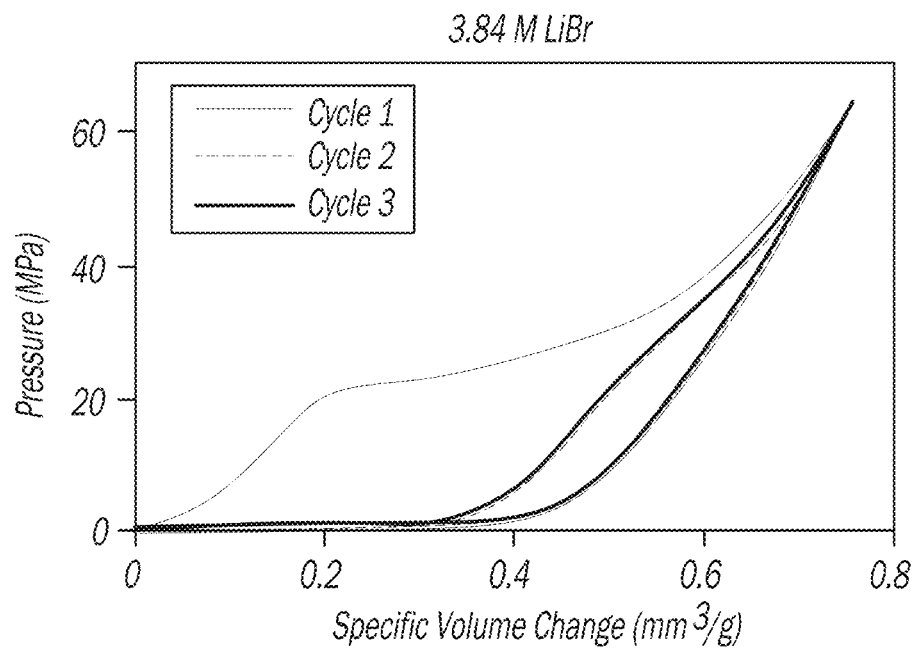

The degree of liquid outflow can be determined by the liquid infiltration plateau of the second cycle, such that FIG. 30 illustrates the first three consecutive loading-unloading curves of the specimen containing 3.04 M of a NaCl aqueous solution. By comparing the first two loading-unloading cycles, $P_{in}$ is increased while the width of the infiltration plateau is greatly reduced in the second cycle. This indicates that only partial nanopore volume is available for liquid infiltration in the second cycle, which is the volume of liquid flowing out of the nanopore during the unloading process of the first cycle. The width of the infiltration plateau of each cycle is defined as the specific volume change between the loading and unloading curves at the pressure of 17 MPa. As both the loading and unloading curves of second and third cycles of the specimen are nearly identical, only the width of infiltration plateau of first and second cycles, $W_1$ and $W_2$, are measured and summarized in Table 4.

TABLE 4

| Electrolyte Solution | $W_1$ (mm³/g) | $W_2$ (mm³/g) | $\eta_{out}$ (%) | f |
|---|---|---|---|---|
| 3.04M NaCl | 395 ± 1 | 162 ± 4 | 41.2 ± 1.0 | 27.0 |
| 3.37M LiCl | 401 ± 10 | 151 ± 6 | 37.6 ± 0.7 | 18.5 |
| 3.43M NaBr | 395 ± 1 | 108 ± 10 | 27.4 ± 2.5 | 19.3 |
| 3.84M LiBr | 400 ± 3 | 72 ± 14 | 18.1 ± 3.3 | 13.5 |

Figure 35:
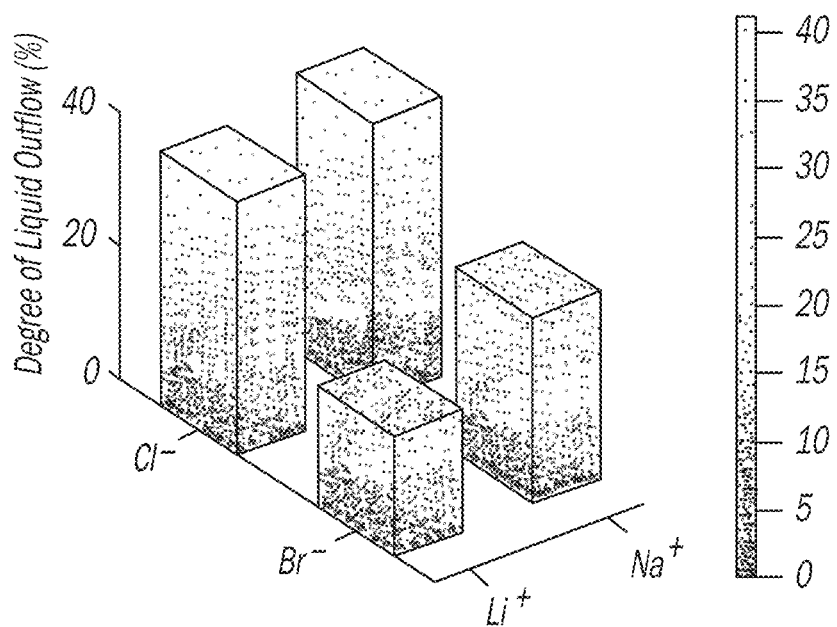
FIG. 35 is a degree of liquid outflow graph for the present apparatus.

The measured $W_1$ is close but smaller than the total pore volume of the nanoporous silica gel, which is due to a van der Waals distance between the liquid molecules and the hydrophobic wall of each nanopore. The degree of liquid outflow equals the reusability of the specimens and is defined as $\eta_{out}=W_2/W_1$. For specimens containing other aqueous electrolyte solutions, the consecutive loading-unloading cycles have the same trend as the NaCl-based system. The loading-unloading cycles of specimens for 3.04 M NaCl, 3.37 M LiCl, 3.43 M NaBr and 3.84M LiBr is depicted in FIGS. 31-34, respectively, and the calculated average degree of liquid outflow of the specimens is illustrated in FIG. 35. Although all the solutions have the same excessive solid-liquid interfacial tension, they have different degrees of liquid outflow. The ratio between the nano- and bulk-gas solubility is the oversolubility factor f in Table 4. The smaller values are due to the presence of electrolytes.

TABLE 5

| Electrolyte Solution | $C_O$ (M) | $P_B$ (MPa) | $C_B$ (M) | $P_E$ (MPa) | $C_E$ (M) | $C_{Nano}$ (M) |
|---|---|---|---|---|---|---|
| 3.04M NaCl | 2.85 × 10⁻⁴ | 27.7 ± 1.4 | 7.85 × 10⁻² | 0.45 ± 0.10 | 1.55 × 10⁻³ | 7.70 × 10⁻³ |
| 3.37M LiCl | 3.71 × 10⁻⁴ | 26.7 ± 0.5 | 9.83 × 10⁻² | 0.51 ± 0.02 | 2.23 × 10⁻³ | 6.85 × 10⁻³ |
| 3.43M NaBr | 2.92 × 10⁻⁴ | 25.8 ± 1.8 | 7.49 × 10⁻² | 0.65 ± 0.13 | 2.18 × 10⁻³ | 5.63 × 10⁻³ |
| 3.84M LiBr | 3.97 × 10⁻⁴ | 18.9 ± 2.4 | 7.46 × 10⁻² | 0.68 ± 0.10 | 3.08 × 10⁻³ | 5.36 × 10⁻³ |

Table 5 states the estimated bulk phase gas solubility in selected aqueous electrolyte solutions at 23° C. The ion species have influence on $C_O$, f and $\eta_{out}$. In the bulk phase, cation has a more prominent effect on gas solubility since Na⁺ based systems have much reduced gas solubility; this is due to the solvated cation structure in the solution. In the nanopores, however, both cations and anions have significant effect on the oversolubility factor. This is because of the unique ion structure in the nanopores where a solvated cation structure cannot fully developed. Instead, the anions have stronger interaction with the water molecules that can otherwise dissolve gas molecules. Na⁺ has less effect on f than Li⁺, as the gas oversolubility in Na⁺ based solutions is closer to that in pure water. Similarly, Cl⁻ has less effect on f than Br⁻. Consequently, the pair of Na⁺ and Cl⁻ has the least effect on f, while the pair of Li⁺ and Br dramatically reduces f.

Moreover, the oversolubility factors for LiCl and NaBr solutions are similar and in between the values of NaCl and LiBr. These gas oversolubility effects on liquid outflow are shown in FIG. 36.

It is envisioned that one or more of the following electrolytes may be used if the liquid is water:

Cations: $Li^+$, $Na^+$, $K^+$, $Rb^+$, $Cs^+$, $Mg^{2+}$, $Cr^{2+}$, $Ba^{2+}$, $Fe^{2+}$, $Co^{2+}$, $Ni^{2+}$, $Cu^{2+}$, $Mn^{2+}$, $Zn^{2+}$, $Cd^{2+}$, $Al^{3+}$, $Fe^{3+}$, and/or $Cr^{3+}$.

Anions: $F^-$, $Cl^-$, $Br^-$, $I^-$, $NO_3^-$, $HCO_3^-$, $SO_4^{2-}$, and/or $CO_3^{2-}$.

In summary, pairs of cations and anions not only alter the gas solubility in bulk phase but also affect the gas oversolubility factor in the nanopores of the present energy absorbing apparatus. The degree of liquid outflow from the hydrophobic nanopores is determined by both the bulk solubility and the oversolubility factor, such that a lower bulk gas solubility and a larger gas oversolubility factor in nanopores lead to a greater degree of liquid outflow and an increase of reusability for repeated impact absorption of the present system. Notably, anions have more effect on the degree of liquid outflow and the system reusability than cations.

It is also envisioned that one or more of the gases listed in Table 6 may be used in the liquid solution in any of the embodiments herein. For example, gases such as $CO_2$, with low bulk solubility and a large oversolubility factor, have the potential to further increase the degree of liquid outflow.

TABLE 6

| gas | Solubility in Water at 25 C., 1 atm (M) | Oversolubility Factor |
|---|---|---|
| Helium | $3.7 \times 10^{-4}$ | |
| Neon | $4.5 \times 10^{-4}$ | |
| Nitrogen | $6.1 \times 10^{-4}$ | 30[1], 1800[2] |
| Hydrogen | $7.8 \times 10^{-4}$ | 6.3[3] |
| Air | $7.9 \times 10^{-4}$ | 27[4] |
| Oxygen | $1.3 \times 10^{-3}$ | |
| Argon | $1.4 \times 10^{-3}$ | |
| Carbon Dioxide | $3.4 \times 10^{-2}$ | 15[1], 300[2] |

Optionally, with any of the embodiments disclosed herein, a surfactant may be included in the liquid and nanoporous particle solution. For example, a surfactant such as Pluronic F127 is mixed with the silica gel microparticles and liquid, such as by vigorous agitation. The typical nanoporous particle to liquid mass ratio in this "liquid marble" configuration is in the range of 0.64 to 15.75. Therefore, the liquid phase is "dissolved" by the nanoporous particles whereby microdroplets are dispersed in between the particles.

Referring to FIGS. 3-7 and 18, another exemplary use employs structures 53 and 57 as rigid metal or cement walls, support beams or piers in a residential or commercial building, or civil engineering construction such as a bridge or road overpass. The liquid 71 and microparticle 73 solution, with or without a sealed pouch, acts as a vibration and/or earthquake dampener or isolator between the walls or beams. More particularly, structures 53 and/or 57 may be aligned pistons 82 which directly compress against the solution contained within a chamber having sidewalls; one of the pistons may be attached to the ground or a structural floor while the upper one supports a load. Alternately, such a single or double piston configuration can be used between automotive components (e.g., crash absorbing bumpers or side impact beams) or aerospace components (e.g., landing gear).

While various features of the present invention have been disclosed, it should be appreciated that other variations may be employed. For example, different particle, nanopore and pouch shapes and sizes can be employed, although various advantages of the present system may not be realized. As another example, while a hydrogel is not necessary with the present apparatus, it may nevertheless be used, but certain cost and performance benefits may not be obtained. Additionally, alternate electrolytes, gases and liquids can be employed, although performance and cost may differ. It should also be appreciated that at least a majority of the particles will act as described hereinabove, although a minority of those employed may not due to manufacturing variations in nanopore size. Features of each of the embodiments and uses may be interchanged and replaced with similar features of other embodiments, and all of the claims may be multiply dependent on each other in any combination. Variations are not to be regarded as a departure from the present disclosure, and all such modifications are intended to be included within the scope and spirit of the present invention.

The invention claimed is:

1. An energy absorbing apparatus comprising:
   (a) a liquid including electrolytes;
   (b) particles located in the liquid, the particles including nanopores;
   (c) a hydrophobic material on the particles;
   (d) inner gas molecules without the liquid being located within the nanopores, and outer gas molecules dissolved in the liquid located outside of the particles, in an ambient condition;
   (e) the liquid and the particles being configured to allow an externally applied force to cause the liquid to enter the nanopores and dissolve the inner gas molecules to create oversolubility therein;
   (f) the liquid and the particles being configured to allow the oversolubility and the electrolytes to cause the liquid to exit the nanopores when the force is removed; and
   (g) the matrix being reusable multiple times to absorb repeated applications of the force.

2. The apparatus of claim 1, wherein the electrolytes alter the gas solubility of the liquid in a bulk phase external to the particles and also alter a gas oversolubility factor in the nanopores.

3. The apparatus of claim 2, further comprising a degree of liquid outflow from the hydrophobic nanopores is determined by both the gas solubility in the bulk phase and the oversolubility factor.

4. The apparatus of claim 1, further comprising a sealed and flexible pouch coupled to an inside surface of an exterior shell, the liquid and particles being contained within the pouch, and the particles being microparticles.

5. The apparatus of claim 4, wherein the shell is part of a wearable helmet, the shell is a substantially rigid polymeric material, and the pouch is a polymeric membrane.

6. The apparatus of claim 1, further comprising a sealed and flexible pouch coupled to a rigid structural support, the liquid and particles being contained within the pouch, and the liquid and particles act as vibration or earthquake dampeners for the structural support.

7. The apparatus of claim 1, further comprising a sealed and flexible pouch coupled to a rigid wall, the liquid and particles being pre-pressurized within the pouch in the ambient condition, to reduce volume of the gas therein.

8. The apparatus of claim 1, wherein:
   complete saturation of the outer gas molecules within the liquid outside of the particles deter the inner gas molecules from outflowing from the nanopores, in the ambient condition; and
   the saturation and the hydrophobic material deter the liquid from entering the nanopores, in the ambient condition.

9. The apparatus of claim 1, wherein when the force is removed, wherein liquid-gas phase separation takes place causing bubble nucleation, further comprising a surfactant being mixed in the liquid.

10. The apparatus of claim 1, wherein the electrolytes are anions.

11. The apparatus of claim 1, wherein the electrolytes are at least one of:
(a) NaCl;
(b) LiCl;
(c) NaBr; or
(d) LiBr.

12. The apparatus of claim 1, wherein the gas is $CO_2$.

13. The apparatus of claim 1, wherein the gas is air.

14. The apparatus of claim 1, wherein the gas is Nitrogen.

15. The apparatus of claim 1, wherein the gas is Helium.

16. The apparatus of claim 1, wherein the particles are microparticles.

17. The apparatus of claim 1, wherein the liquid is salt water.

18. The apparatus of claim 1, wherein a ratio of the gas to the liquid is 0.15 to 1.4, based on volume in the ambient condition.

19. The apparatus of claim 1, further comprising a piston aligned with and being configured to compress a solution of the liquid, the particles and the gas molecules, the piston being coupled to one of: a building structure, a civil engineering structure, an automotive vehicle component or an aerospace component.

20. An energy absorbing apparatus comprising:
(a) a substantially rigid wall;
(b) a flexible pouch coupled to the wall;
(c) a liquid including anions, being contained within the pouch;
(d) particles located in the liquid, the particles including nanopores;
(e) inner gas molecules without the liquid being located within at least a majority of the nanopores, and outer gas molecules dissolved in the liquid located outside of the particles, in an ambient condition;
(f) substantially complete saturation of the outer gas molecules within the liquid outside of the particles deterring the inner gas molecules from outflowing from at least a majority of the nanopores, in the ambient condition;
(g) the saturation deterring the liquid from entering at least a majority of the nanopores, in the ambient condition;
(h) an externally applied force operably pushing the liquid into at least a majority of the nanopores and dissolve the inner gas molecules to create oversolubility therein; and
(i) the oversolubility causing the liquid to exit at least a majority of the nanopores when the force is removed, wherein liquid-gas phase separation takes place causing bubble nucleation.

21. The apparatus of claim 20, wherein the particles are microparticles with a hydrophobic coating.

22. The apparatus of claim 20, wherein:
the gas is at least one of: $CO_2$, Nitrogen or Helium; and
the liquid is salt water.

23. The apparatus of claim 20, wherein the anions alter the gas solubility of the liquid in a bulk phase external to the particles and also alter a gas oversolubility factor in the nanopores.

24. An energy absorbing apparatus comprising:
(a) an exterior wall being substantially rigid;
(b) a sealed and flexible pouch coupled to an inside surface of the wall;
(c) liquid and particles located within the pouch;
(d) each of the particles having at least one nanopore;
(e) a hydrophobic coating on the particles;
(f) inner gas molecules being located within at least a majority of the nanopores and at least a majority of the nanopores being free of the liquid in an ambient condition, and outer gas molecules being dissolved in the liquid located outside of the nanopores in the ambient condition;
(g) substantially complete saturation of the outer gas molecules within the liquid outside of the nanopores deterring the inner gas molecules from outflowing from at least a majority of the nanopores in the ambient condition;
(h) the saturation and the hydrophobic coating deterring the liquid from entering at least a majority of the nanopores in the ambient condition;
(i) an externally applied force causing the liquid to enter at least a majority of the nanopores and dissolve the inner gas molecules to create oversolubility therein;
(j) the oversolubility causing the liquid to exit at least a majority of the nanopores when the force is removed, wherein liquid-gas phase separation takes place causing bubble nucleation; and
(k) the apparatus being reusable multiple times to absorb repeated applications of the force.

25. The apparatus of claim 24, wherein the gas is at least one of: $CO_2$, Nitrogen or Helium.

26. The apparatus of claim 24, wherein a depth of the nanopores is no greater than a width of the nanopores in at least a majority of the particles.

27. The apparatus of claim 24, wherein the liquid is at least one of: salt water or an electrolytic solution.

28. The apparatus of claim 24, wherein a solution of the liquid, the particles and at least one type of the gas molecules, are pre-pressurized within the pouch, in an ambient condition, by a piston acting upon the solution prior to the pouch being coupled to the exterior wall.

29. An energy absorbing apparatus comprising:
(a) a solution of liquid and particles;
(b) each of the particles having at least one nanopore;
(c) inner gas molecules being located within at least a majority of the nanopores and at least a majority of the nanopores being free of the liquid in an ambient condition, and outer gas molecules being dissolved in the liquid located outside of the nanopores in the ambient condition;
(d) substantially complete saturation of the outer gas molecules within the liquid outside of the nanopores deterring the inner gas molecules from outflowing from at least a majority of the nanopores in the ambient condition;
(e) the saturation deterring the liquid from entering at least a majority of the nanopores in the ambient condition;
(f) an externally applied force causing the liquid to enter at least a majority of the nanopores and dissolve the inner gas molecules to create oversolubility therein;
(g) the oversolubility causing the liquid to exit at least a majority of the nanopores when the force is removed, wherein liquid-gas phase separation takes place causing bubble nucleation;
(h) a piston aligned with and being configured to compress the solution due to the force, the piston being coupled to one of: a building structure, a civil engineering structure, an automotive vehicle component or an aerospace component; and (i) the apparatus being reusable multiple times to absorb repeated applications of the force.

\* \* \* \* \*